(12) United States Patent
Deleeuw et al.

(10) Patent No.: US 9,967,093 B2
(45) Date of Patent: May 8, 2018

(54) TECHNIQUES FOR SECURING AND CONTROLLING ACCESS TO DATA

(71) Applicant: INTEL CORPORATION, Santa Clara, CA (US)

(72) Inventors: William C. Deleeuw, Beaverton, OR (US); Ned M. Smith, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

(21) Appl. No.: 14/668,634

(22) Filed: Mar. 25, 2015

(65) Prior Publication Data
US 2016/0285631 A1 Sep. 29, 2016

(51) Int. Cl.
| | |
|---|---|
| G06F 17/30 | (2006.01) |
| G06F 12/08 | (2016.01) |
| H04L 9/06 | (2006.01) |
| H04L 9/08 | (2006.01) |
| G06F 7/58 | (2006.01) |
| H04L 29/06 | (2006.01) |

(Continued)

(52) U.S. Cl.
CPC ............ H04L 9/0869 (2013.01); G06F 7/582 (2013.01); G06F 21/6218 (2013.01); H04L 63/0428 (2013.01); H04L 2209/24 (2013.01)

(58) Field of Classification Search
CPC ...... G06F 7/582; G06F 12/02; G06F 21/6218; G06F 3/0683; G06F 3/0689; H04L 2209/24; H04L 63/0428; H04L 9/0869; H04L 2209/601; H04L 9/0836; H04L 67/1097; H04L 9/0816; H04L 9/0891
See application file for complete search history.

(56) References Cited

U.S. PATENT DOCUMENTS 5,754,844 A * 5/1998 Fuller .................. G06F 3/0608
8,051,052 B2 * 11/2011 Jogand-Coulomb ... G06F 21/10
707/694

(Continued)

OTHER PUBLICATIONS

Goyal, Vipul, et al. "Attribute-based encryption for fine-grained access control of encrypted data." Proceedings of the 13th ACM conference on Computer and communications security. Acm, 2006.*

(Continued)

*Primary Examiner* — Michael Simitoski

(57) ABSTRACT

Various embodiments are directed to techniques for controlling access to data in a decentralized manner. An apparatus includes an apportioning component to divide an item of data into multiple portions based on an organizational structure of the item of data; a tree component to generate a PRN tree including a multitude of nodes and a branching structure based on the organizational structure, the multitude including at least one branching node and multiple leaf nodes that correspond to the multiple portions; a PRN component to generate a PRN for each node of the multitude, the PRN component to use a PRN of a branching node of the PRN tree to generate a PRN for a leaf node that depends therefrom; and a communications component to transmit the multiple portions and multiple addresses based on PRNs of leaf nodes of the PRN tree to a server. Other embodiments are described and claimed.

19 Claims, 17 Drawing Sheets

(51) Int. Cl.
*G06F 21/62* (2013.01)
*G06F 7/00* (2006.01)

(56) References Cited

U.S. PATENT DOCUMENTS

| | | | | |
|---|---|---|---|---|
| 8,209,334 | B1* | 6/2012 | Doerner | G06F 3/061 |
| | | | | 707/698 |
| 9,253,166 | B2* | 2/2016 | Gauda | G06F 21/6218 |
| 2002/0065848 | A1* | 5/2002 | Walker | G06F 17/24 |
| | | | | 715/205 |
| 2002/0135801 | A1* | 9/2002 | Tessman, Jr. | G06F 17/30265 |
| | | | | 358/1.15 |
| 2004/0078577 | A1 | 4/2004 | Feng et al. | |
| 2005/0172124 | A1* | 8/2005 | Carpentier | G06F 17/3061 |
| | | | | 713/165 |
| 2006/0059179 | A1* | 3/2006 | Asano | H04L 9/0836 |
| 2006/0062394 | A1* | 3/2006 | Kamijo | H04L 63/0442 |
| | | | | 380/282 |
| 2007/0094263 | A1* | 4/2007 | Tessman | G06F 21/6209 |
| 2010/0082865 | A1* | 4/2010 | Kirshenbaum | G06F 21/6218 |
| | | | | 710/113 |
| 2011/0295914 | A1* | 12/2011 | Mori | G06F 3/0608 |
| | | | | 707/812 |
| 2012/0215746 | A1* | 8/2012 | Auchmoody | G06F 17/30067 |
| | | | | 707/674 |
| 2013/0103942 | A1 | 4/2013 | Sullivan et al. | |
| 2013/0227209 | A1* | 8/2013 | Czerkowicz | G06F 17/30097 |
| | | | | 711/104 |
| 2014/0068211 | A1* | 3/2014 | Fiske | G06F 11/1456 |
| | | | | 711/162 |
| 2014/0108707 | A1* | 4/2014 | Nowoczynski | G06F 12/0246 |
| | | | | 711/103 |
| 2014/0108723 | A1* | 4/2014 | Nowoczynski | G06F 12/0866 |
| | | | | 711/113 |
| 2014/0245020 | A1* | 8/2014 | Buldas | G06F 21/64 |
| | | | | 713/177 |
| 2014/0297776 | A1* | 10/2014 | Volvovski | H04L 67/1097 |
| | | | | 709/212 |
| 2014/0380471 | A1* | 12/2014 | Levow | H04L 63/1408 |
| | | | | 726/23 |
| 2015/0019673 | A1* | 1/2015 | Bayerl | H04L 67/1097 |
| | | | | 709/213 |
| 2015/0026454 | A1* | 1/2015 | Boeuf | G06F 12/0269 |
| | | | | 713/152 |
| 2015/0082399 | A1 | 3/2015 | Wu et al. | |
| 2015/0205818 | A1* | 7/2015 | Darcy | G06F 17/30194 |
| | | | | 707/822 |
| 2016/0292048 | A1* | 10/2016 | Dolan | G06F 11/1469 |

OTHER PUBLICATIONS

Grolimund, Dominik, et al. "Cryptree: A folder tree structure for cryptographic file systems." 2006 25th IEEE Symposium on Reliable Distributed Systems (SRDS'06). IEEE, 2006.*
Miklau, Gerome, and Dan Suciu. "Controlling access to published data using cryptography." Proceedings of the 29th international conference on Very large data bases—vol. 29. VLDB Endowment, 2003.*
International Search Report and Written Opinion received for PCT Patent Application No. PCT/US2016/024087, dated May 23, 2016, 9 pages.

* cited by examiner

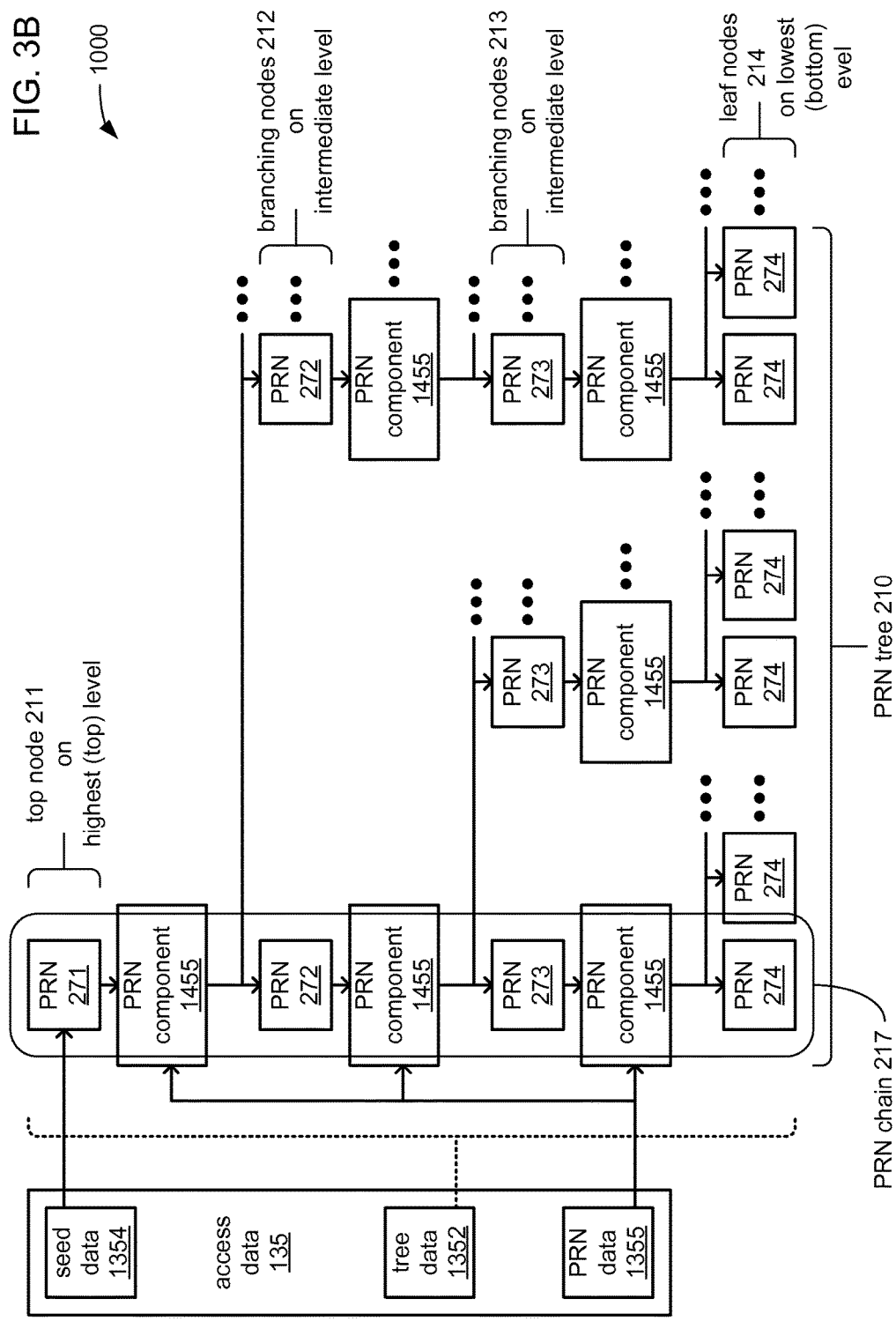

TECHNIQUES FOR SECURING AND CONTROLLING ACCESS TO DATA

BACKGROUND

Various approaches to securely storing data in a manner accessible to multiple persons while also controlling the scope and type of access have been widely adopted. Such approaches often include the use of passwords, fingerprints, time-based security keys and/or other forms of security token to control the scope and/or type of access available and to whom that access is granted. However, such approaches often require some form of centralized management to provide such control, including the maintenance of data concerning the scope and/or types of access granted to each user and/or group of users. Stated differently, such approaches often require the establishment of accounts for each user and/or group of users with which such information concerning access is associated.

Aside from the costs, complexities and oversight required to establish and maintain such centralized control, the fact of the existence of a centralized repository of such information concerning access for each user and/or group of users additionally creates a target for those seeking to acquire such information for nefarious purposes. This often leads to considerable additional expenditures and further oversight required to sufficiently secure such a centralized repository against malicious efforts at stealing that information.

BRIEF DESCRIPTION OF THE DRAWINGS

FIGS. 3A, 3B, 3C, 3D and 3E, together, illustrate an example embodiment of preparing data for storage by a server in a manner securely accessible through a network.

DETAILED DESCRIPTION

Figure 1:
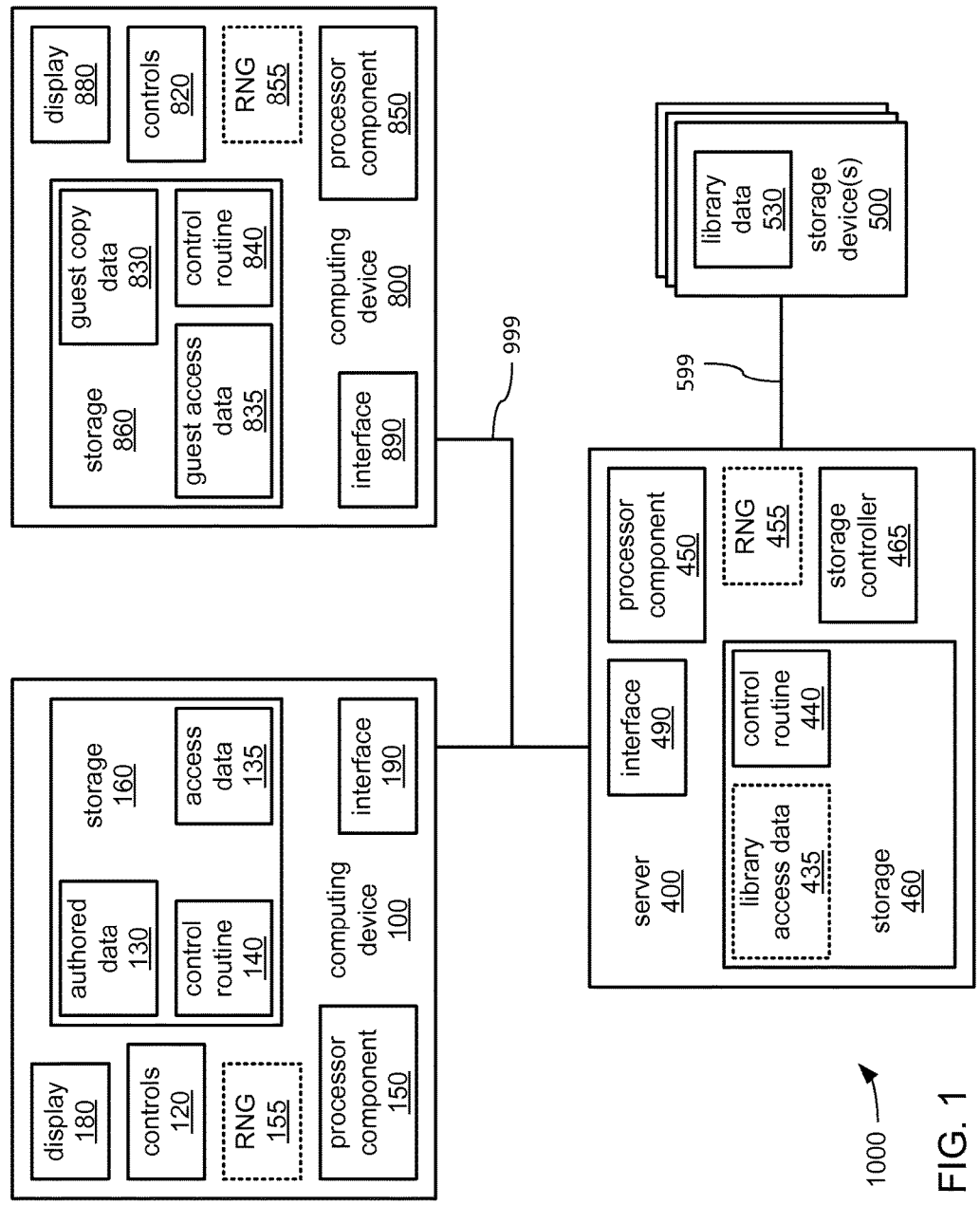
FIG. 1 illustrates an example embodiment of a data storage system.

Various embodiments are generally directed to techniques for securing and controlling the scope and type of access to data in a decentralized manner that avoids significant centralized management efforts and costs. Data is divided into portions with each portion associated with a leaf node of a hierarchical tree of pseudo-random numbers (PRNs) that are pseudo-randomly generated starting with a seed value associated with the top node of the tree. Progressing from the top node at the top of the PRN tree and downward towards the leaf nodes toward the bottom of the PRN tree, the PRNs associated with each lower level of branching nodes of the tree are pseudo-randomly generated from PRN(s) associated with each immediately preceding higher level of branching nodes until PRNs associated with leaf nodes are generated. The scope of access to the data that is granted to any one user or group of users may be limited by providing a PRN associated with a leaf node or a branching node of the PRN tree other than the PRN associated with the top branching node of the PRN tree. The type of access to the data that is granted to any one user or group of users may be limited by employing parallel trees of identical branching structure in which one tree is associated with granting read access and the other is associated granting additional access that includes permissions to modify the data.

The seed value, itself, may be pseudo-randomly generated or generated using a digital random number generator that employs quantum effect and/or other techniques to generate the seed value with a sufficient degree of randomness as to avoid the security risks often associated with an individual selecting a seed value that may in some way be guessed based on knowledge of that person by others. The bit width of the seed and of the PRNs derived therefrom throughout such a PRN tree may be selected to be sufficiently large as to define a range of possible number values for each PRN that is sufficiently large as to enable the creation of a sparse addressing scheme in which guessing addresses that are based on the PRNs of the leaf nodes becomes prohibitively difficult. By way of example, the seed and all PRNs derived therefrom may be selected to be 256 bits in width to define a quantity of possible values able to be represented by that quantity of bits that may be of an order of magnitude akin to the quantity of grains of sand or dirt making up the Earth, or the quantity of all of the celestial bodies in the universe. Thus, even with the help of the highest performing forms of computer technology, iterating through all of the possible values for such PRNs and examining what data may be present at addresses based on those PRNs is likely to require a prohibitive quantity of years, if not decades, to accomplish.

With the bit width of the seed and PRNs derived therefrom selected to be so large, and with the seed also at least pseudo-randomly generated, the possibility of collisions between PRNs used as the basis of addresses among a great many individuals and/or groups of individuals (e.g., corporate or government entities) is statistically extremely small. Thus, each person or entity made up of a group of persons may generate PRNs on which to base addresses at which portions of data may be stored without coordination thereamong, and with confidence that the addresses that are generated in this way are statistically highly unlikely to be in use by another person or entity. Stated differently, the use of a sufficiently large bit width may enable entirely decentralized and uncoordinated generation and use of addresses for the storage of portions of data by numerous persons and/or entities with little or no concern for the possibility of two or more persons or entities competing for the same address.

The addresses generated in this manner may be assigned to storage locations within one or more storage devices maintained by one or more servers, and may be accessible on a network such as the Internet using those addresses. Each such storage location may be of large or small size, and/or may be of a variable size based on the size of the portion of data stored therein.

Such a server or servers may not store or otherwise have access to the seed values or indications of what random number generation and/or pseudo-random number generation algorithms are employed by any of the persons or entities who provide data to the server or servers for such storage. Instead, computing devices employed by each such person or entity may employ the pseudo-random number generation algorithms and seed values of their choice to derive the PRNs on which the addresses for the storage of those portions of data are based. Those computing devices may then transmit the portions of data and associated addresses to the server or servers for storage. Upon receiving such portions of data and associated addresses, the server or servers may store each portion of data in a separate storage location within the one or more storage devices and may assign the received addresses based on PRNs to those locations such that those received addresses may be subsequently used to access those portions within those storage locations.

The top branching node of the PRN tree may and the seed value may be associated with a single piece of data that is divided into portions such that the branching to reach down to the leaf nodes associated with those portions may begin immediately at the top of the PRN tree. Alternatively, the top of the PRN tree and the seed value may be associated with a collection of multiple pieces of data that are associated with a person, a group of persons, a corporate entity, a government entity, etc. Thus, at the top branching node at the top of the tree, each branch may be associated with a separate piece of data and/or a separate category of data, such as separate documents, the work of separate persons or departments of a larger group of persons, a separate calendar or fiscal year, a separate project, etc. The manner in which multiple pieces of data may be organized or distributed among the topmost level or levels of branching in the PRN tree may be entirely arbitrary based on whatever approach to organizing data may be deemed desirable.

The data may be any of a variety of types of data, including and not limited to, recorded or computer-generated audio, recorded or computer-generated video, still images, numerical values, text, biometric data, personally identifiable information (e.g., names, street addresses, phone numbers, etc.), medical records, financial information, communications records, business records, government records, 3D models and/or blueprints. The granularity of division of the data into the portions may be arbitrarily chosen such that each portion of data associated with a leaf node of a PRN tree may be a letter, a word, a phrase, a sentence, a paragraph, a chapter, a numeric value, a column, a row, a table, a calculation, a graph, a figure, an image, a portion of an image, a series of images, a phoneme, a syllable, a time slice of audio, an entry or range of entries of an index, and/or any other form of arbitrarily defined apportionment of data.

The scope of access to the portions of a piece of data or to multiple pieces of data may be determined by which PRN in the hierarchy of PRNs in the PRN tree is provided to a computing device of a person who seeks access. By way of example where a piece of data is a document of numerous paragraphs and where each paragraph is associated with a leaf node of a hierarchical tree of PRNs, access to a single paragraph of that document may be granted by providing the PRN of the leaf node in that PRN tree that is associated with that single paragraph. Where the seed and PRNs employ a sufficiently large bit width, the provision of that PRN associated with that single paragraph will not enable guessing or derivation of any of the higher level PRNs in the PRN tree or any of the PRNs of other leaf nodes in an effort to gain access to more of that document. Continuing with this example of granting access to a document, if it should later be deemed appropriate to grant that same person access to more of that document, then doing so may be accomplished by providing that person with a higher level PRN associated with a branching node in the PRN tree from which multiple leaf nodes depend that are associated with multiple paragraphs that define an appropriate scope of access for that person.

In some embodiments, the use of PRNs having a bit width great enough to enable generation of a sparse addressing scheme may, itself, be deemed sufficient to provide a considerable degree of security against unauthorized access to data due to the prohibitive nature of searching for data through such a vast range of possible addresses. In such embodiments, the PRNs associated with each of the leaf nodes of a PRN tree and derived from PRNs associated with branching nodes may be directly used as addresses at which the portions of data associated with those leaf nodes may be accessed. However, in other embodiments, still further security measures may be deemed desirable, including encrypting the portions of data that correspond to each of the leaf nodes of such a PRN tree. In such other embodiments, the PRNs associated with the leaf nodes of a PRN tree may be used as seeds to pseudo-randomly generate still other PRNs, one of which may be used as an address, another of which may be used as an encryption key and/or still another of which may be used as an integrity verification key. Thus, returning to the earlier example of a person being granted access to a single paragraph of a document, that person's computing device may be provided with a PRN of the leaf node that is associated with that paragraph, and from that PRN, other PRNs serving as the address at which to access that paragraph and/or the encryption key needed to decrypt that paragraph may be pseudo-randomly generated.

Alternatively or in addition to the use of encryption to further secure portions of data, control over the type of access granted to one or more portions of data may be maintained through the use of parallel PRN trees that share the same branching structure to the extent of having a one-to-one correspondence between their branching and leaf nodes. Read-only access to stored portions of data may be granted by providing PRNs from only the one of the PRN trees that is associated with read access. Access that includes the ability to write to and/or otherwise modify stored portions of data may be granted by providing PRNs from corresponding branching and/or leaf nodes of both the PRN tree associated with read access and a parallel PRN tree that is associated with the ability to modify. The server may allow or disallow the ability to modify one or more portions of data based on whether a request from a computing device for access to the one or more portions includes PRNs from only the PRN tree associated with read access or addresses derived from both PRN trees, as will be explained in greater detail.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a data storage system 1000 incorporating one or more of a computing device 100, a server 400, storage device(s) 500 and a computing device 800. Each of these devices 100, 400, 500 and 800 may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

In the data storage system 1000, the computing device 100 may transmit data that may have been authored using the computing device 100 to the server 400 for storage by the server 400 within one or more of the storage device(s) 500 accessible to and controlled by the server 400. Within the computing device 100, the data may be divided into multiple portions, each of which may be intended to be made accessible by the server 400 at an address based on pseudo-random numbers (PRNs) at the leaf nodes of a PRN tree made up of PRNs that may be generated by the computing device 100. The computing device 100 may then transmit the portions and addresses based on the PRNs of the leaf nodes to the server 400 to effect storage of the portions with the server 400 at those addresses. In so doing, various techniques may be employed to foil efforts at snooping to determine correlations of addresses to the portions. Subsequent to such storage of the data within the one or more storage devices 500 by the server 400, the computing device 100 may transmit one of the PRNs of the PRN tree to the computing device 800 to enable the computing device 800 to access some or all of the data earlier transmitted by the computing device 100 to the server 400, depending on the location of that transmitted PRN within the PRN tree. The computing device 800 may then transmit address(es) based on the received PRN to the server 400 as part of a request for access to one or more portions of the data associated with one or more leaf nodes in the portion of the PRN tree that is associated with that received PRN.

As depicted, one or more of these devices 100, 400, 500 and/or 800 may exchange signals conveying data, as well as addresses and/or PRNs employed in accessing that data through a network 999. However, one or more of these computing devices may exchange other data entirely unrelated to such data or to the use of addresses and/or PRNs to gain access to such data with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. It should also be noted that such data may alternatively be exchanged via direct coupling of a removable storage (e.g., a solid-state storage based on FLASH memory technology, an optical disc medium, etc.) at different times to each.

In various embodiments, the computing device 100 incorporates one or more of a processor component 150, a random number generator (RNG) 155, a storage 160, manually-operable controls 120, a display 180 and an interface 190 to couple the computing device 100 to the network 999. The storage 160 stores one or more of a control routine 140, authored data 130 and access data 135. The control routine 140 incorporates a sequence of instructions operative on the processor component 150 in its role as a main processor component of the computing device 100 to implement logic to perform various functions.

In executing the control routine 140 in some embodiments, the processor component 150 may operate the controls 120 and the display 180 to provide a user interface by which an operator may interact with the computing device 100 to generate the authored data 130, including a piece of data (e.g., a document, a motion video, an audio recording, a still image, etc.) that is to be transmitted to the server 400 for storage. Following creation of the piece of data, and in preparation for its storage by the server 400, the processor component 150 may divide the piece of data into multiple portions that may be at least partly based on the manner in which the content of the piece of data is organized therein. The processor component 150 may then generate a tree structure that represents the manner in which those portions are so organized, and may generate one or more PRNs at each level of that tree structure, creating a hierarchy of PRNs that follows the structure of the tree from a single PRN at the top branching node at the top of the tree to multiple PRNs at the leaf nodes towards the bottom of the tree, where each leaf node is associated with one of the portions. The processor component 150 may then use the PRNs to derive at least addresses for each of those portions of the piece of data in preparation for transmitting those portions to the server 400 for storage in a manner in which they will be made accessible through the network 999 at those addresses. The processor component 150 may additionally derive encryption keys and/or integrity verification keys for each of those portions to further secure each of those portions as stored by the server 400 within one or more of the storage devices 500.

Figure 2:
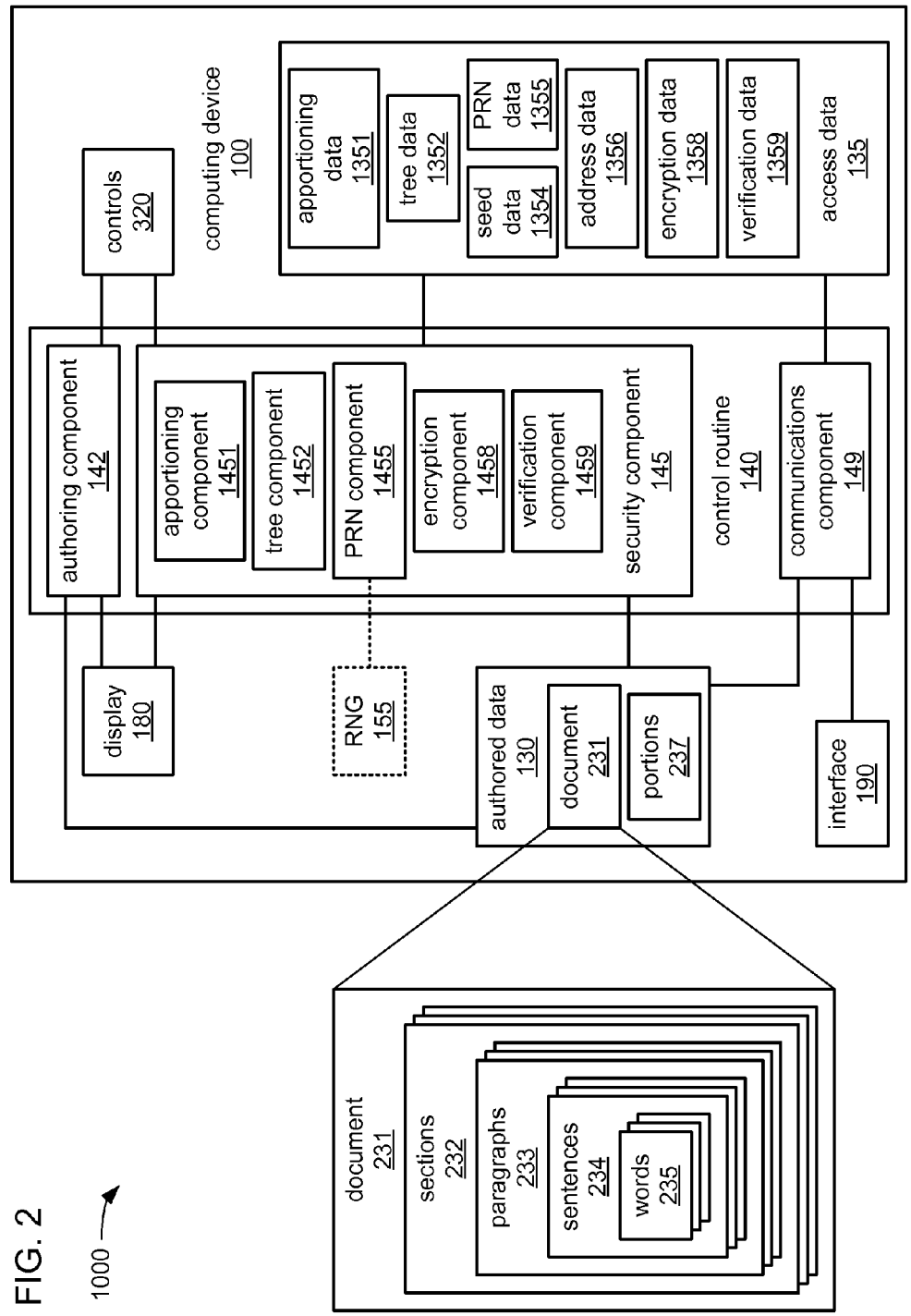
FIG. 2 illustrates an example embodiment of a computing device to prepare data for storage.

FIG. 2 illustrates a portion of an embodiment of the data storage system 1000, including aspects of an operating environment of the computing device 100 in which the processor component 150 executes the control routine 140 to generate an example document 231 and an associated tree of PRNs. As depicted, the control routine 140 may include one or more of an authoring component 142, a security component 145 and a communications component 149. In executing the control routine 140, the processor component 150 may execute one or more of the components 142, 145 and 149.

In executing the authoring component 142, the processor component 150 may provide a user interface in which the operator of the computing device 100 is presented with authoring and/or editing functions by which the operator may generate various pieces of data that make up the authored data 130. Thus, in various embodiments, the authoring component 142 may include word processing software, illustration software, image and/or video creation and/or editing software, audio recording and/or editing software, etc., depending on the nature of the pieces of data created. As previously discussed, the authored data 130 may be made up of any of a variety of types of data (or combinations thereof), including and not limited to, recorded or computer-generated audio, recorded or computer-generated video, still images, numerical values, text, biometric data, personally identifiable information (e.g., names, street addresses, phone numbers, etc.), medical records, financial information, communications records, business records, government records, 3D models and/or blueprints.

As an example for sake of discussion herein, the authored data 130 is depicted as including the example document 231. As depicted, the document 231 is divided into sections 232, each of which is made up of one or more paragraphs 233, where each paragraph 233 is made up of one or more sentences 234 that are each in turn made up of words 235. The document 231 may be any of a variety of types of documents, including and not limited to, a status report, a thesis, a white paper, a pamphlet, a script, a operating manual, a book, etc. Thus, despite the depiction of a particular organization of particular portions that make up this example document 231, this depicted organization of portions is meant to serve as an example, and the contents of other example documents (or other entirely different types of data) may be organized into any of a variety of other ways leading to division into portions that may be organized in any of variety of other ways.

Following execution of the authoring component 142 to enable an operator of the computing device 100 to generate the example document 231, the processor component 150 may execute the security component 145 to prepare the example document 231 for storage within one or more of the storage devices 500 by the server 400. As depicted, the security component 145 may include an apportioning component 1451 for execution by the processor component 150 to divide a piece of the authored data 130, such as the example document 231, into portions, such as the depicted portions 237, in preparation for transmission to the server 400 for storage. In some embodiments, the apportioning component 1451 may interact with the operator of the computing device 100 (e.g., via the controls 120 and/or the display 180) to guide the operator through providing indications of the manner in which to so divide a piece of the authored data 130, such as the example document 231. In other embodiments, the apportioning component 1451 may automatically divide a piece of the authored data 130 into portions based on various criteria for defining the portions into which that piece of the authored data 130 is to be so divided.

Thus, in the case of the example document 231, the apportioning component 1451 may automatically divide the example document 231 into portions 237 that each include a single one of the paragraphs 233 by analyzing the formatting employed within the document 231 by which paragraphs are typically defined (e.g., hard carriage returns to end each paragraph, extra carriage returns between paragraphs and/or the indentation of the first word of the first sentence of each paragraph). The granularity of the division of the document 231, or of any other piece of the authored data 130, may be specified by the operator of the computing device 100. Thus, for example, instead of dividing the document 231 into portions 237 defined by the paragraphs 233, the operator of the computing device 100 may specify that the document 231 be divided up into portions 237 defined by individual sentences such that the apportioning component 1453 may automatically divide the example document 231 into the sentences 234 detected by the presence of a period at the end of each of the sentences 234 and/or by the presence of a capital letter at locations in the text that are consistent with the start of one of the sentences 234 versus locations in the text that are consistent with the start of a proper noun within one of the sentences 234. However, the apportioning component 1451 may still automatically identify the paragraphs 233 and/or the sections 232 of the document 231, in addition to identifying the sentences 234, as part of deriving the structure of the document 231 by which the sentences 234 (and therefore, the portions 237) are organized within the document 231.

Alternatively or additionally, the granularity of the division of the document 231, or of any other piece of the authored data 130, may differ between pieces of the authored data 130 that are so prepared for storage and/or may differ based on the type of data included in each piece of the authored data 130. By way of example, where a piece of authored data 130 that is so prepared includes tables, graphs, drawings, photos and/or other images interspersed among text, each of those images may become a separate portion into which that piece of authored data 130 is divided. By way of another example, where a piece of the authored data 130 includes audio and/or video recordings, locations of breaks in those recordings based on detectable periods of silence in audio and/or detectable scene changes in video may be employed in defining the portions into which that piece of the authored data 130 is divided. Alternatively or additionally, such continuous data as audio/video or a calendar may be divided into portions that are each associated with a measure of time within a hierarchy of measures of time. This may enable the scope of access that may be granted (e.g., the selection of which portions to which access is to be granted) to be specified temporally, such as with a range of times and/or dates. By way of example, a piece of audio or video may be divided into one or more larger periods of time of multiple minutes (e.g., a quarter hour, a half hour or a full hour) apiece, which may each be divided into intermediate periods of time of time of about a minute or two apiece, which may in turn each be divided into smaller periods of time of one or more seconds, with each of such smaller periods of time defining the portions into which that piece of audio or video may be divided. Regardless of the type of data that is divided into portions or the manner in which the apportioning component 1451 proceeds through a piece of the authored data 130 (e.g., the example document 231) to divide it into portions, the apportioning component 1451 may store indications of the manner in which that piece of data is divided into portions as part of the access data 135, specifically, as the depicted apportioning data 1351. Thus, the apportioning component 1451 may store indications of the manner in which the example document 231 is divided into the portions 237 and how those portions are organized within the document 231 as the apportioning data 1351.

As depicted, the security component 145 may include a tree component 1452 for execution by the processor component 150 to generate a tree having a structure that corresponds to the structure of a piece of the authored data 130 that has been divided into portions. More precisely, the tree component 1452 generates a tree having leaf nodes in its structure that correspond to the portions of a piece of the authored data 130 that has been divided into portions, and that has branching nodes defining a branching structure that corresponds to the detected structure of organization of those portions within that piece of the authored data 130.

Figure 3A:
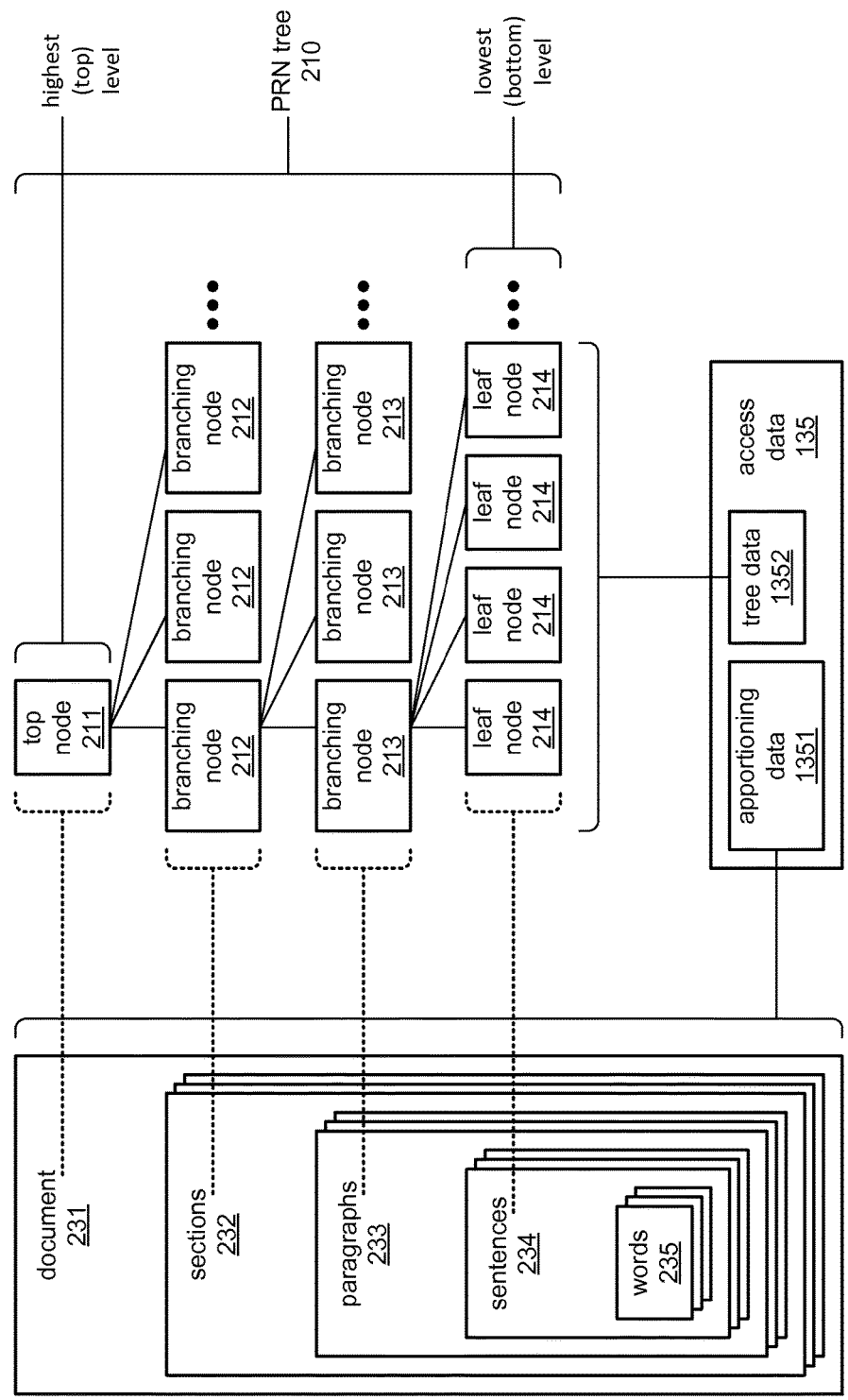

FIG. 3A illustrates an example embodiment of generation by the tree component 1452 of an example PRN tree 210 that corresponds to the document 231. In so doing, the tree component 1452 may retrieve details of the manner in which the document 231 is divided into the portions 237 and the structure of the document 231 by which the portions 237 are organized within the document 231 from the apportioning data 1351. As depicted, the example PRN tree 210 includes a single top node 211 at the highest level of the PRN tree 210, multiple leaf nodes 214 at the lowest level towards the bottom of the PRN tree 210, and two intermediate levels of branching nodes 212 and 213. The top node 211 corresponds to the document 231, each of the branching nodes 212 correspond to one of the sections 232 of the document 231, each of the branching nodes 213 correspond to one of the paragraphs 233 of the document 233, and each of the leaf nodes 214 correspond to one of the sentences 234.

The fact of there being leaf nodes (specifically, the leaf nodes 214) at a level that corresponds to the sentences 234 of the document 231 indicates that the document 231 may have been divided in a manner in which each of the portions 237 includes a single one of the sentences 234 such that each leaf node 214 also corresponds to one of the portions 237. It should again be noted that the manner in which a piece of the authored data 130, such as the example document 231, is divided into portions (e.g., the granularity of those portions) is entirely arbitrary. Thus, it is possible that the example document 231 could alternatively be divided into many smaller portions that each include a single one of the words 235 such that the PRN tree 210 may have its leaf nodes at a still lower level (below the depicted lowest level) where each leaf node would correspond to one of the words 235. Indeed, it is possible that the example document 231 could be divided into a still greater quantity of still smaller portions that each include only a single letter of one of the words 235. Alternatively, it is also possible that the example document 231 could be divided into a lesser quantity of larger portions that each include an entire one of the paragraphs 233 such that the PRN tree 210 may have its leaf nodes at a higher level where each leaf node would correspond to one of the paragraphs 233. Thus, the portions 237 into which the document 231 is divided may each include more or less of the document 231 depending on the arbitrary choice of how to divide the document 231 into the portions 237. It may be that considerations of how the document is to be used may be taken into account such as what is deemed to be the likely size of the portions 237 that are deemed likely to be accessed at a later time following storage of the document 231 by the server 400.

Returning to FIG. 2, regardless of the quantity of levels within the PRN tree 210 or the quantity of nodes at any particular level, the tree component 1452 may store indications of the structure of the PRN tree 210 as part of the access data 135, specifically, as the depicted tree data 1352. As depicted, the security component 145 may include a PRN component 1455 for execution by the processor component 150 to generate one or more PRNs associated with each of the nodes of a PRN tree, such as the example PRN tree 210 that corresponds to the example document 231. More precisely, the PRN component 1455 follows each of the branches of a PRN tree to pseudo-randomly generate one or more PRNs at each node using a PRN pseudo-randomly generated at the higher level node from which that node depends as a seed value. In so doing, the PRN component generates chains of PRNs that each start with a PRN at the top of the PRN tree, proceed downward through the nodes along the branching structure of the tree, and end at a leaf node towards the bottom of the tree.

FIG. 3B illustrates an example embodiment of generation of PRNs in a manner following the structure of the example PRN tree 210. In so doing, the PRN component 1455 may retrieve details of the structure of the PRN tree 210 from the tree data 1352. As depicted, at each of the branching nodes 211, 212 and 213, the PRN component 1455 generates a PRN for each node that branches down to the next lower level from that node using the PRN that was earlier generated for that node as a seed value for doing so. More specifically, as previously discussed, the top node 211 may be provided with a PRN 271 for use as a seed value from which all other PRNs associated with the PRN tree 210 may be directly or indirectly generated. The PRN component 1455 may pseudo-randomly generate the PRN 271 from a seed value retrieved from the seed data 1354.

In some embodiments, that seed value retrieved from the seed data 1354 by the PRN component 1455 may be generated by the RNG 155 in a manner that is deemed to be more random than is possible using pseudo-random generation techniques. Specifically, the RNG 155 may incorporate digital circuitry that may employ a quantum effect based on any of a variety of techniques to achieve some degree of quantum uncertainty to generate numbers that may be deemed to be more truly random. Alternatively or additionally, the RNG 155 may incorporate one or more electronic components to use thermal noise derived from a resistor, avalanche noise derived from a Zener diode, electromagnetic noise (e.g., static charges) in the local atmosphere or some other form of detectable form of noise to generate numbers that may be deemed to be more truly random.

Regardless of the exact manner in which the PRN 271 is derived and/or provided for the top branching node 211 on the highest (top) level, the PRN component 1455 may use the PRN 271 as a seed value to pseudo-randomly generate a different PRN 272 for each of the branching nodes 212 on the level immediately below the highest (top) level that depend from the top branching node 211. Similarly, for each of the branching nodes 212, the PRN component 1455 may use the PRN 272 generated specifically for that branching node 212 to pseudo-randomly generate a different PRN 273 for each of the branching nodes 213 on the next lower level that depend from that branching node 212. Also similarly, for each of the branching nodes 213, the PRN component 1455 may use the PRN 273 generated specifically for that branching node 213 to pseudo-randomly generate a different PRN 274 for each of the leaf nodes 214 on the lowest (bottom) level that depend from that branching node 213.

As a result of this manner of generating PRNs for each node, a chain of PRNs follows the path of branches in the PRN tree 210 from each leaf node 214 at or near the bottom of the PRN tree 210 to the top branching node 211 at the top level of the PRN tree 210, such as the one depicted example PRN chain 217 which encompasses one each of the PRNs 271 through 274 along a single one of the paths of branching in the structure of the PRN tree 210 from the top branching node 211 to a single one of the leaf nodes 214. The fact of the use of multiple stages of pseudo-random number generation to generate each of the PRNs 274 that is provided to one of the leaf nodes 214, and the fact of there necessarily being some difference in the chain of PRNs that extend from the top branching node 211 to each of the leaf nodes 214 ensures that knowledge of the PRN 274 for one of the leaf nodes 214 does not enable the derivation of any of the other PRNs 274 provided to any of the other leaf nodes 214.

In generating the various PRNs 271, 272, 273 and/or 274, the PRN component 1455 may retrieve an indication of what pseudo-random number generation algorithm to employ and/or various inputs to such an algorithm from PRN data 1355 that may be included within the access data 135. Returning to FIG. 2, in generating the various PRNs 271, 272, 273 and/or 274, the PRN component 1455 may employ the RNG 155, which in addition to incorporating circuitry to generate random numbers based on quantum effect or a detectable noise source, may also incorporate digital circuitry to implement one or more pseudo-random number generating algorithms. Such use of hardware-based digital logic to implement at least a portion of a pseudo-random number generating algorithm may increase the speed with which it is possible to generate PRNs. This may significantly reduce the time required to generate PRNs for a particularly large PRN tree. As familiar to those skilled in data security, the amount of time required to perform various security-related functions is a factor in decisions made by operators of computing device as to whether they choose to use those security-related functions or choose convenience and saving time by foregoing their use.

Figure 3C:
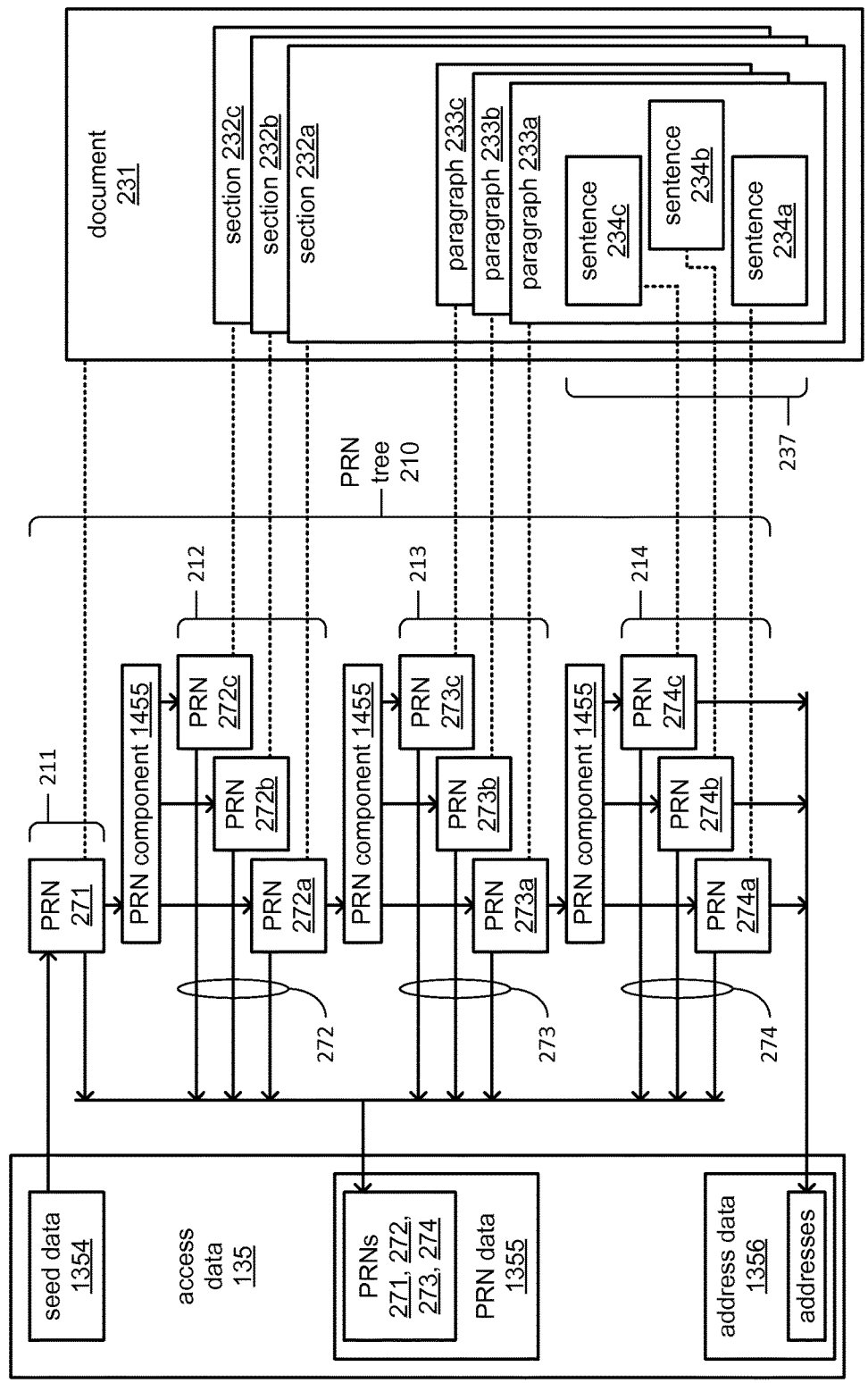

FIG. 3C illustrates an example result of both dividing the document 231 into the portions 237 that each include one of the sentences 234 and generating the PRNs 274 for each of the leaf nodes 214 corresponding to one of the portions 237. It should be noted for sake of discussion that in FIG. 3C and subsequent figures, the reference numerals of depicted individual ones of the PRNs 272-274, the sections 232, the paragraphs 233 and the sentences 234 have letters appended to them to enable individual ones of each to be more easily matched in those figures and to be specifically referred to in this text. However, it should be clear that the PRNs 272*a-c* are each instances of the PRNs 272, the PRNs 273*a-c* are each instances of the PRNs 273, the PRNs 274*a-c* are each instances of the PRNs 274, the sections 232*a-c* are each instances of the sections 232, the paragraphs 233*a-c* are each instances of the paragraphs 233, and the sentences 234*a-c* are each instances of the sentences 234.

As depicted in FIG. 3C, the PRN 271 corresponds to the top node 211, and therefore, corresponds to the document 231; each of the PRNs 272*a-c* corresponds to one of the branching nodes 212, and therefore, corresponds to one of the sections 232*a-c*, respectively; each of the PRNs 273*a-c* corresponds to one of the branching nodes 213, and therefore, corresponds to one of the paragraphs 233*a-c*, respectively; and each of the PRNs 274*a-c* corresponds to one of the leaf nodes 214, and therefore, corresponds to one of the sentences 234*a-c*, respectively. Since each of the portions 237 into which the example document 231 has been divided includes a single one of the sentences 234, each of the PRNs 274 therefore corresponds to one of the portions 237.

As also depicted, in some embodiments, this correspondence between the portions 237 and the PRNs 274 may be availed of by directly employing each of the PRNs 274 as an address at which its corresponding one of the portions 237 may be made accessible to other computing devices. More specifically, the PRNs 274*a-c* may be directly employed as the addresses at which the portions 237 that include the sentences 234*a-c*, respectively, may be made accessible. Indeed, the PRNs 274 (including the PRNs 274*a-c*) may be stored as part of the access data 235, specifically as addresses of address data 1356. In so storing the PRNs 274 as addresses, information correlating each of these addresses to one of the portions 237 may also be included in the address data 1356.

Returning to FIG. 2, in executing the communications component 149, the processor component 150 may transmit the portions 237 to the server 400 accompanied by indications of the addresses at which each of the portions 237 are to be made available to other computing devices via the network 999. As previously discussed, the server 400 may store the portions 237 within one or more of the storage devices 500 from which one or more of the portions 237 may be subsequently retrieved by the server 400 in response to requests to so retrieve those portion(s) 237 that refer to those portion(s) 237 with the correct address(es).

Figure 3D:
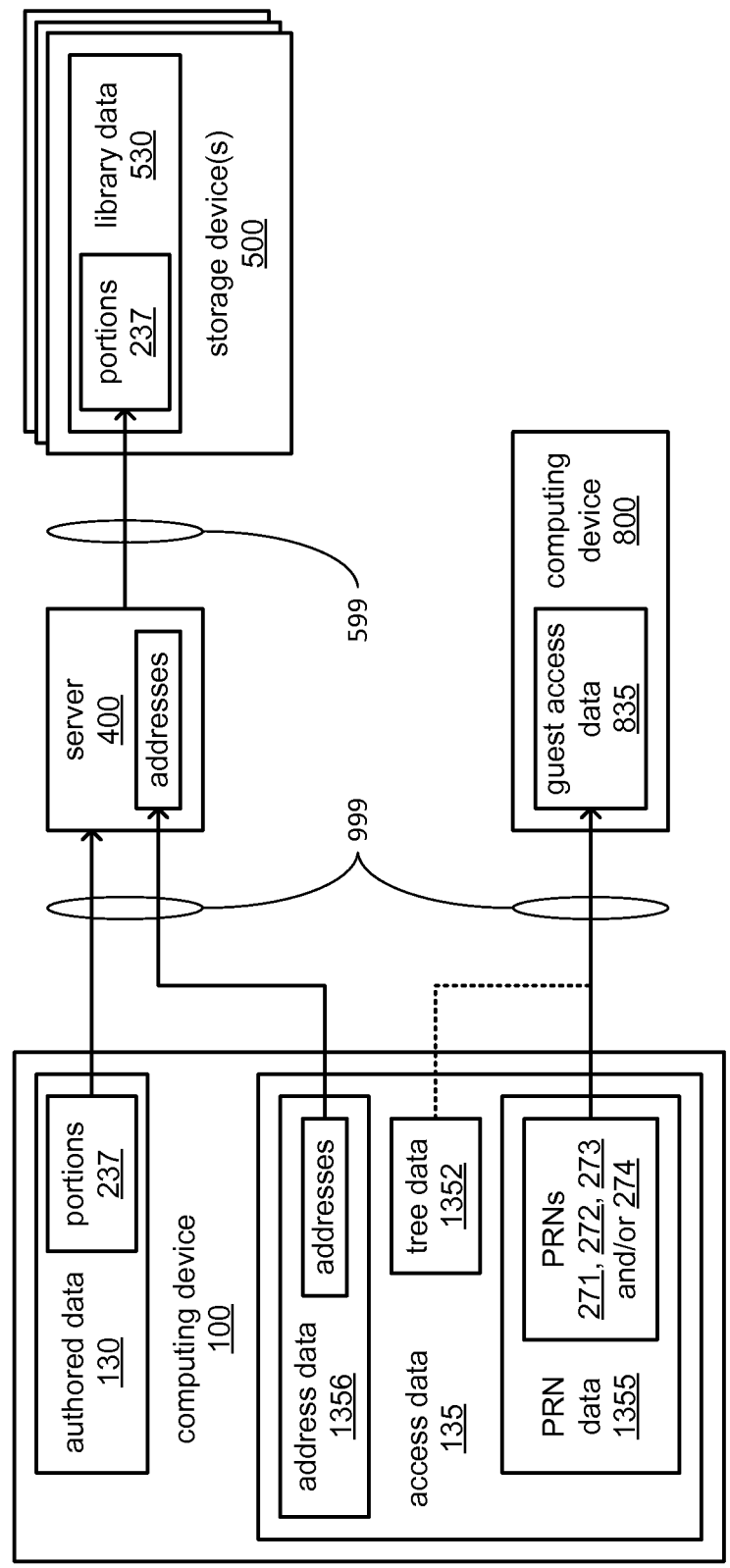

FIG. 3D illustrates an example of such provisioning of the server 400 with the portions 237 and/or provisioning the computing device 800 with either selected ones of the addresses or information required to derive selected ones of the addresses. As depicted, the computing device 100 may transmit the portions 237 into which the example document 231 was earlier divided to the server 400. The computing device 100 may also transmit at least the addresses correlated to each of the portions 237, which were earlier stored as part of the address data 1356. The computing device 100 may further transmit indications also retrieved from the address data 1356 of which of the addresses are correlated to which of the portions 237. Alternatively, the portions 237 and the addresses may each be transmitted in an order that implies the correlations therebetween. In using some form of ordering to convey such correlations in a manner that is implied, some form of scrambling of that ordering may be employed to prevent personnel operating the server 400 from discerning aspects of the organizational structure. By way of example, the portions 237 and their corresponding addresses may deliberately not be transmitted to the server 400 in the order in which they appear within the document 231.

As will be explained in greater detail, upon receiving the portions 237 and their corresponding addresses, the server 400 may store the portions 237 among portions of other pieces of data maintained as library data 530 within one or more of the storage devices 500. Further, the server 400 may make the portions 237 available for access by other computing devices (e.g., the computing device 800) through the network 999 at corresponding ones of the addresses received from the computing device 100.

As will also be explained in greater detail, where the operator of the computing device 100 seeks to grant access to the operator of the computing device 800 to one or more of the portions 237, the operator of the computing device 100 may interact with the computing device 100 to transmit the address(es) of the one or more portion(s) 237 to the computing device 800 via the network 999. The computing device 800 may then be operated by its operator to transmit a request for access to the one or more portions 237 to the server 400 through the network 999 in which the request refers to the one or more portions 237 by the addresses received from the computing device 100.

Alternatively, where the quantity of the portions 237 to which access is to be granted to the operator of the computing device 800 is sufficiently large that transmitting multiple addresses to the computing device 800 may be deemed undesirable, the computing device 100 may be operated to transmit a PRN (e.g., one of the PRNs 271, 272 or 273) corresponding to a node of the PRN tree 210 from which the leaf nodes 214 depend that correspond to the one or more portions 237 to which access is to be granted to the operator of the computing device 800. Stated differently, the scope of the access to the portions 237 of the example document 231 to which access may be granted may be determined by selecting a one of the PRNs 271, 272 or 273 that corresponds to a one of the branching nodes 211, 212 or 213. The computing device 800 may then be operated to employ the selected one of the PRNs 271, 272 or 273 to derive all of the PRNs that correspond to all of the nodes in the PRN tree 210 (including the leaf nodes 214) that depend from the node that corresponds to that selected one of the PRNs 271, 272 or 273.

Thus, the structure of the PRN tree 210 may be used as a tool to provide a limited scope of access to one or more of the portions 237. By way of example, and referring again to FIG. 3C, if access is to be granted to the operator of the computing device 800 to only the portions 237 that include the sentences 234*a-c* that make up the paragraph 233*a*, then the computing device 100 may transmit to the computing device 800 the PRN 273*a* from which each of the PRNs 274*a-c* that correspond to the sentences 234*a-c*, respectively, may be derived. The computing device 800 may then employ the received PRN 273*a* to so derive the PRNs 274*a-c*, and then employ the derived PRNs 274*a-c* as addresses in a request to the server 400 for access to one or more of the portions 237 that include the sentences 234*a-c*, respectively. However, if access is to be granted to the entire document 231, then the computing device 100 may transmit to the computing device 800 the PRN 271 from which all of the PRNs 272, 273 and 274 may be derived. The computing device 800 may then employ the received PRN 271 to so derive all of the PRNs 272, 273 and 274, and then employ some or all of the PRNs 274 (including one or more of the PRNs 274*a-c*) as addresses in a request to the server 400 for access to some or all of the portions 237 to obtain access to whichever ones of the sentences 234 to which the operator of the computing device 800 seeks access.

It should be noted that to enable such generation of one or more of the PRNs 272, 273 and/or 274 by the computing device 800, the computing device 100 may transmit to the computing device 800 an indication retrieved from the PRN data 1355 of the particular pseudo-random number generation algorithm employed by the computing device 100 in generating the PRNs 271, 272, 273 and/or 274. Alternatively or additionally, the computing device 100 may transmit an indication retrieved from the tree data 1352 of the branching structure of the PRN tree 210 to enable the computing device 800 to correctly follow the paths of the various branches within the PRN tree 210 in generating PRNs. As an alternative to transmitting an explicit indication of the branching structure of the tree 210 directly to the computing device 800, various markers may be embedded in the portions 237 earlier transmitted to the server 400, where the marker(s) embedded within each portion 237 indicates at least where the leaf node 214 to which that portion corresponds fits within the PRN tree 210 and/or indicates at least a portion of the branching structure of the PRN tree 210 that includes that leaf node 214. Such embedded indications may provide guidance to the computing device 800, upon retrieving one of the portions 237, of where in the branching structure an adjacent portion 237 may be.

Returning to FIG. 2, as previously discussed, with a sufficiently large bit-width for the PRNs 271, 272, 273 and 274, as well as the for the seed used to generate the PRN 271, the range of address values that may be assigned to any of the portions 237 may be so large that the computing device 100 and numerous other computing devices (not shown) may each be able employ random and/or pseudo-random generation of numbers to generate and assign addresses to portions of data in an entirely uncoordinated manner with a statistically extremely small risk of any two portions of data ever being assigned the same address. As also previously discussed with such a sufficiently large bit-width, the range of address values may be so large that it may become impractical to attempt to guess the addresses at which the portions of a piece of data may be stored or to search through the entire range of addresses to locate the portions of a piece of data. As a result, the portions 237 of the example document 231 may be made available by the server 400 through the network 999 at the addresses provided to the server 400 without further security measures, and yet, the example document 231 may actually be deemed to be sufficiently secure from unauthorized access by other computing devices due to the extremely high impracticality of attempting to locate the portions 237 as part of an effort to make an unauthorized copy of the example document 231.

However, despite this level of security provided to the example document 231 by use of such an addressing scheme for its portions 237, it may still be deemed desirable to employ still further security to prevent even one of the sentences 234 from being found and read or copied. As depicted, the security component 145 may include an encryption component 1458 for execution by the processor component 150 to encrypt the contents of the example document 231 that make up each of the portions 237 prior to the transmission of the portions 237 to the server 400. Thus, when the portions 237 are transmitted to the server 400 for storage, each of the portions 237 may be encrypted to provide an additional form of protection of the example document 231. Since the example document 231 was divided into its sentences 234, one of each of which became one of the portions 237, the encryption component 1458 may encrypt the single sentence 234 that makes up each of the portions 237. This may be deemed particularly desirable where there may be some concern that an operator of the server 400 may attempt to read the contents of the portions 237 as the portions 237 are received from the computing device 100 for storage by the server 400.

As familiar to those skilled in the art of encryption, many encryption algorithms employ an encryption key. In some embodiments, a single encryption key may be employed to encrypt all of the portions 237, and this single encryption key (or a corresponding single decryption key) could then be transmitted to the computing device 800 to enable decryption of whichever ones of the portions 237 are retrieved by the computing device 800 from the server 400. However, in other embodiments, different encryption keys may be used to encrypt each of the portions 237, and each of those encryption keys may be derived as a PRN along with the addresses at which each of the portions 237 are to be made accessible.

As also depicted, the security component 145 may include a verification component 1459 for execution by the processor component 150 to take a cryptographic hash of each of the portions 237 both before they are transmitted to the server 400 and as one or more of the portions 237 are subsequently retrieved from the server 400. If the retrieved portions 237 have not been corrupted or otherwise altered, then the cryptographic hashes taken at those two different times should match. Not unlike many encryption algorithms, many cryptographic hash algorithms also employ a key, specifically a verification key. As with the encryption key, a single verification key may be used in taking cryptographic hashes of all of the portions 237, or a different verification key may be derived for each of the portions 237 as a PRN along with the addresses at which each of the portions 237 are to be made accessible.

Figure 3E:
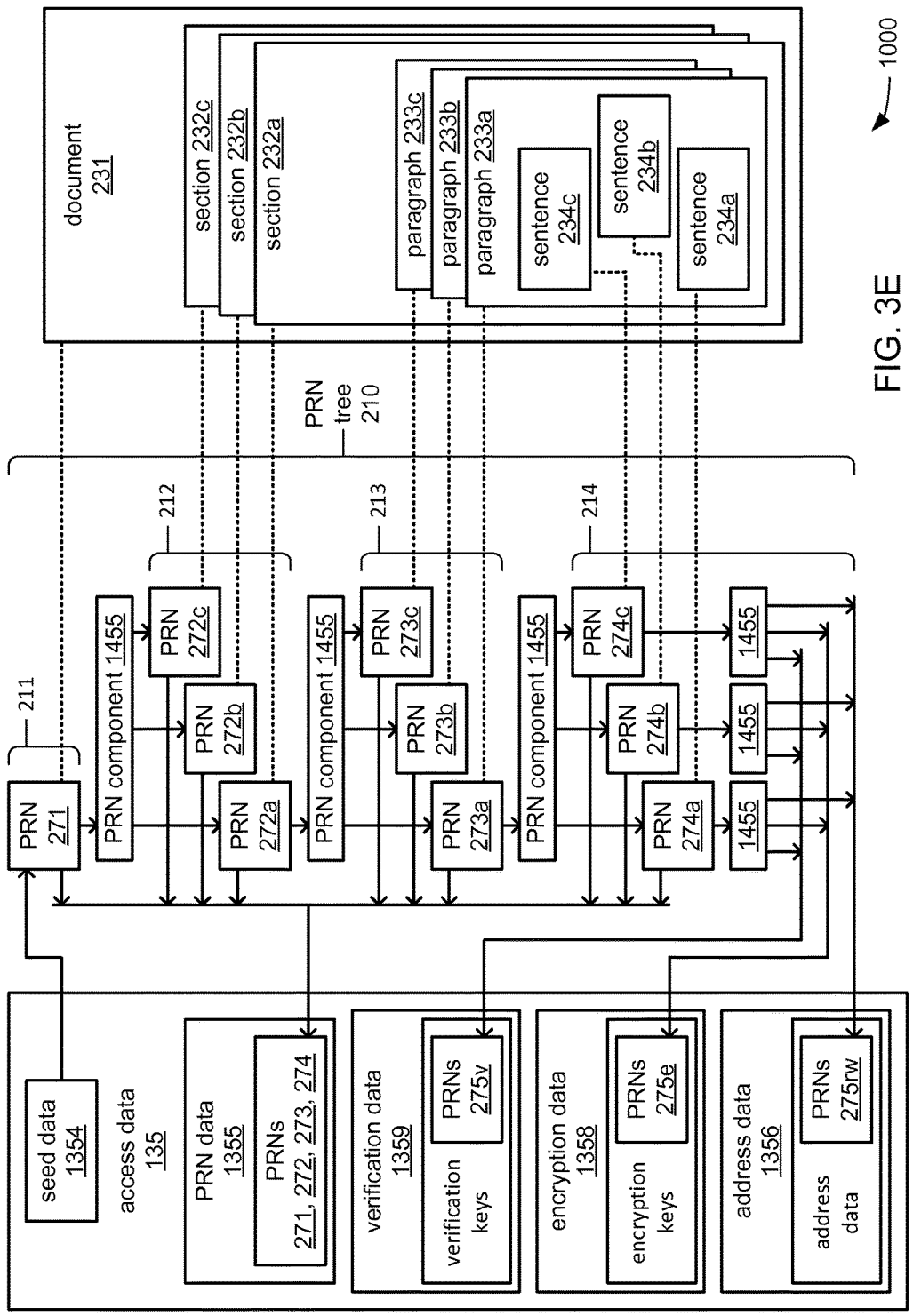

FIG. 3E illustrates an example result, similar to FIG. 3C, of both dividing the document 231 into the portions 237 that each include one of the sentences 234 and generating PRNs for each of the leaf nodes 214 corresponding to one of the portions 237. However, unlike what was depicted in FIG. 3C, at each of the leaf nodes 214, the PRNs 274 (including the PRNs 274a-c) are each used as a seed value to pseudo-randomly generate still further PRNs, each of which may be employed to serve a different function associated with the portions 237 that are associated with the leaf nodes 214. Specifically, at each leaf node 214, the PRN 274 corresponding to that leaf node 214 (e.g., one of the PRNs 274a, 274b or 274c) may be used as a seed by the PRN component 1455 to generate one each of a PRN 275rw to be used as the address at which the corresponding portion 237 of the document 231 may be made accessible for either read or write access, a PRN 275e to be used by the encryption component 1458 as an encryption key to encrypt the corresponding portion 237, and/or a PRN 275v to be used to take cryptographic hashes of the sentence 234 that makes up the corresponding portion 237 to verify its integrity. The PRNs 275rw, 275e and 275v generated for each of the leaf nodes 214 may be stored as part of the address data 1356, encryption data 1358 and verification data 1359, respectively, within the access data 135.

With the PRNs 275rw generated alongside the PRNs 275e and 275v for each of the leaf nodes 214, and with the PRNs 275rw used in place of the PRNs 274 as addresses, knowledge of the PRN 275rw for one of the leaf nodes 214 does not enable the derivation of either of the PRN 275e or 275v for that leaf node 214, and does not enable the derivation of the PRNs 274, 275rw, 275e or 275v for any of the other leaf nodes 214. Thus, it may be the PRNs 275rw that may be transmitted to the server 400 along with the portions 237 that are transmitted to the server 400 for storage.

Further, to grant access to the computing device 800 to one or more portions 237 of the document 231, a one of the PRNs 271, 272, 273 or 274 that corresponds to the scope of access to the document 231 that is deemed appropriate to grant may be transmitted to the computing device 800 to enable the computing device 800 to derive both the PRNs 275rw that serve as addresses for the portions 237 that are within that scope and the PRNs 275e that may serve as the decryption keys for those portions 237 in a symmetric encryption key implementation of encryption in which the same key is used to both encrypt and decrypt. The computing device 800 may then use the PRNs 275rw as addresses in a request transmitted to the server 400 for access to one or more of the portions 237 that are within the scope of access granted to the computing device 800. Upon receiving the one or more portions 237 in a read access, the computing device 800 may then use the PRNs 275e that correspond to the one or more portions 237 to decrypt them.

Returning to FIG. 1, in various embodiments, the server 400 incorporates one or more of a processor component 450, a RNG 455, a storage 460, a storage controller 465 and an interface 490 to couple the computing device 100 to the network 999. The storage 460 stores one or more of a control routine 440 and library access data 435. The control routine 440 incorporates a sequence of instructions operative on the processor component 450 in its role as a main processor component of the server 400 to implement logic to perform various functions.

In executing the control routine 440 in some embodiments, the processor component 450 may operate the interface 490 to await receipt via the network 999 of a transmission conveying at least portions of data to store and associated addresses at which to make those portions accessible on the network 999. Upon receipt of such portions of data and accompanying addresses, the processor component 450 may operate the storage controller 465 to transmit the portions of data via a storage interconnect 599 to one or more of the storage devices 500 to be stored therein. The processor component 450 may also store indications of correlations between the addresses received via the network 999 with the portions of data and internal addresses that indicate the storage locations within the one or more storage devices 500 at which each of the received portions of data is stored. In effect, the processor component 450 assigns the addresses received via the network 999 to corresponding ones of the portions 237. The processor component 450 may further make each of those portions accessible to other computing devices through the network 999 at corresponding ones of the addresses received via the network 999.

Figure 4:
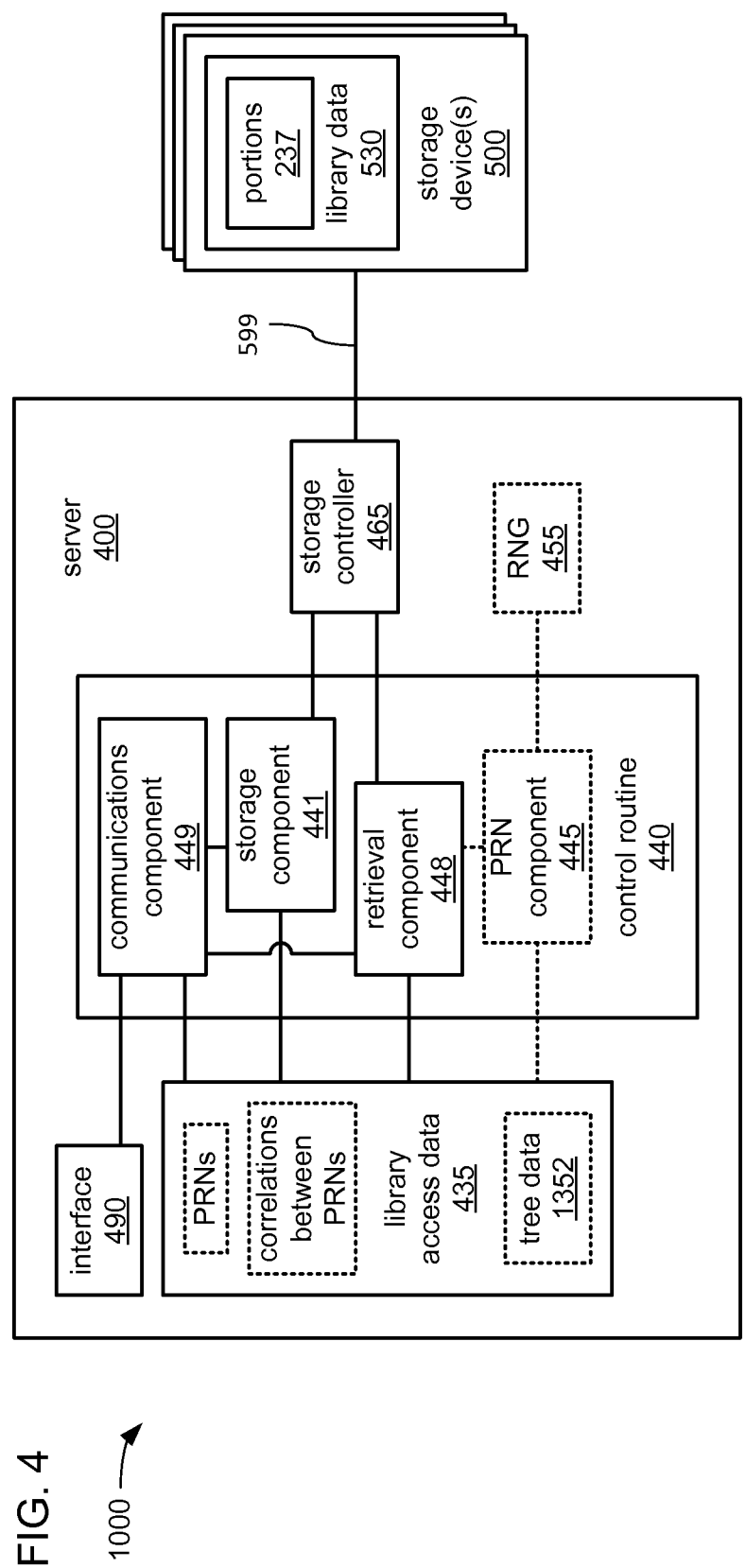
FIG. 4 illustrates an example embodiment of a server to store data in a manner securely accessible through a network.

FIG. 4 illustrates a portion of an embodiment of the data storage system 1000, including aspects of an operating environment of the server 400 in which the processor component 450 executes the control routine 440 to store and make accessible the portions 237 of the example document 231. As depicted, the control routine 440 may include one or more of a storage component 441, a retrieval component 448, a PRN component 445 and a communications component 449. In executing the control routine 440, the processor component 450 may execute one or more of the components 441, 445, 448 and 449.

Continuing with the example of the document 231 divided into the portions 237 for storage, in executing the communications component 449, the processor component 450 may operate the interface 490 to monitor activity occurring on the network 999 for an instance of receiving portions of data and corresponding addresses. Upon receiving the portions 237 of the example document 231 from the computing device 100 along with at least addresses at which to make each portion 237 accessible on the network 999, the communications component 449 may relay the portions 237 and the accompanying addresses to the storage component 441.

In executing the storage component 441 in response to receipt of the portions 237 and at least addresses for each of the portions 237, the processor component 450 may operate the storage controller 465 to identify storage locations within one or more of the storage devices 500 that are available for use in storing the received portions 237, and may so store the portions 237 at those storage locations. The storage component 441 may then assign to each of those storage locations the received addresses associated with the portions 237 stored therein, and may trigger the retrieval component to make the portions 237 accessible on the network 999 at the received addresses. Since the addresses are based on PRNs that have been defined to have relatively large bit widths such that there is a statistically very low chance of a collision among addresses generated by different computing devices on behalf of different persons and/or groups of people, there may be no need for the processor component 450 to determine whether one or more of the addresses received from the computing device 100 is already assigned to a storage location within the one or more storage devices 500 to store an entirely unrelated portion of data. Similarly, there may be no need for the processor component 450 to operate the interface 490 to engage in communications with any other computing device via the network 999 to check if one of the addresses received from the computing device 100 is already assigned to a storage location within a storage device under the control of another server.

In some embodiments, it may be deemed acceptable that on rare occasions, a collision between two different computing devices storing different portions of data at the same address, and the server 400 may take no action to either prevent or respond to such occasions. Instead, it may be left to the computing devices that are caused to compete over a single address to detect that such a situation exists and to take some form of corrective action to address it. By way of example, such a collision event between different computing devices involving a single address may be detected by the different computing devices through use of integrity verification. Specifically, where one of the portions 237 of the document 231 transmitted to the server 400 by the computing device 100 and stored at a particular address has been overwritten with a portion of another piece of data transmitted to the server 400 by a different computing device (not shown) and stored at the same address, the computing device 100 may detect the overwriting of that portion 237 upon later reading that portion 237 from the server 400 and applying the PRN 275$v$ as a verification key to verify the integrity of that portion 237. In response to having detected that the integrity of that portion 237 has been lost, the computing device 100 may pseudo-randomly generate a different PRN 275$rw$ to use as a different address to provide to the server 400 to use in again storing that portion 237. Indeed, the computing device 100 may periodically perform read accesses to the portions 237 as stored by the server 237 and perform integrity verifications on each of the portions 237 to determine the condition of each.

Alternatively, the storage component 441 may take a more active role in addressing occasions in which a collision over a single address occurs. In some embodiments, the server 400 may attempt to accommodate two different computing devices that compete to store two different portions of data at the same address by expanding the capacity of the storage at that address to store both of the portions at the same address. The server 400 may then respond to requests to read a portion of data from that address by supplying both of the two different portions of data to the requesting computing device, thereby allowing the requesting computing device to determine which of the two different portions of data is the one that is of interest to that computing device.

In other embodiments, a write access by which a portion of data is stored at an address location for the first time may be differentiated from other forms of write access that may modify and/or replace the portion of data stored at an address. For example, there may be a distinct "create" command that must be used to store a portion of data at an address for the first time, and the storage component 441 may allow only one use of the create command at each address. Thus, where the computing device 100 has already provided a portion 237 to the server 400 for storage at a particular address using the create command, a later attempt by another computing device to also use the create command to store a different portion of data at the same address may be responded to by the storage component 441 with an indication of an error transmitted via the network 999 back to that other computing device. That other computing device (not shown) may then select a different address at which to cause the server 400 to store that other portion of data. Still other mechanisms for resolving address collisions as may be employed by the storage component 441 may occur to those skilled in the art of database architecture.

In executing the retrieval component 448 in response to storage of the portions 237, the processor component 450 may cooperate with the communications component 449 to make the portions 237 accessible on the network 999 at the addresses generated by and received from the computing device 100. In so doing, any of a variety of network protocols may be employed to enable another computing device (e.g., the computing device 800) to transmit a request via the network 999 to the server 400 for access to one of the portions 237 in a manner that entails specifying that portion 237 by a PRN associated with that portion 237 (e.g., one of the PRNs 271, 272, 273, 274 or 275$rw$). By way of example, such an address may be employed to request a portion 237 as a data file via the file transfer protocol (FTP). Regardless of what protocol is employed in a received request for one of the portions 237, in response to the receipt of such a request, the processor component 450 may determine whether the address specified in that request is among those assigned to the storage locations within one or more of the storage devices 500 at which a portions of data are stored. If the address is found, the then the processor component 450 may operate the storage controller 465 to access that storage location to retrieve the requested portion 237 therefrom, and then operate the interface 490 to transmit the requested portion 237 to the computing device from which the request was received via the network 999.

Although the use of sparse addressing based on a tree of PRNs with large bit widths and/or encryption may be employed to control grant of access to and/or the scope of access to a piece of data (e.g., the example document 231), it may be deemed desirable to also control the type of access granted. Specifically, it may be deemed desirable to control whether the grant of access is read-only in nature or also includes the ability to modify stored data. To provide such control over the type of access granted, in some embodiments, more than one PRN tree associated with a particular piece of data may be generated, with each PRN tree associated with a type or degree of access granted to portions of that piece of data. More specifically, two or more parallel PRN trees may be generated, each of which may have a branching structure based on the manner in which the portions of a piece of data are organized within that piece of data. The PRNs of one of the trees may be employed to grant read access, while the PRNs of another of the trees may be employed to enhance the degree of access with the grant of a type or degree of access that includes the ability to make modifications (e.g., write access). The use of separate PRN trees associated with each type or degree of access may be deemed desirable to ensure that knowledge of a PRN within the PRN tree associated with read access does not enable the derivation of any of the PRNs within the PRN tree associated with a type of access that includes the ability to modify data.

Figure 5A:
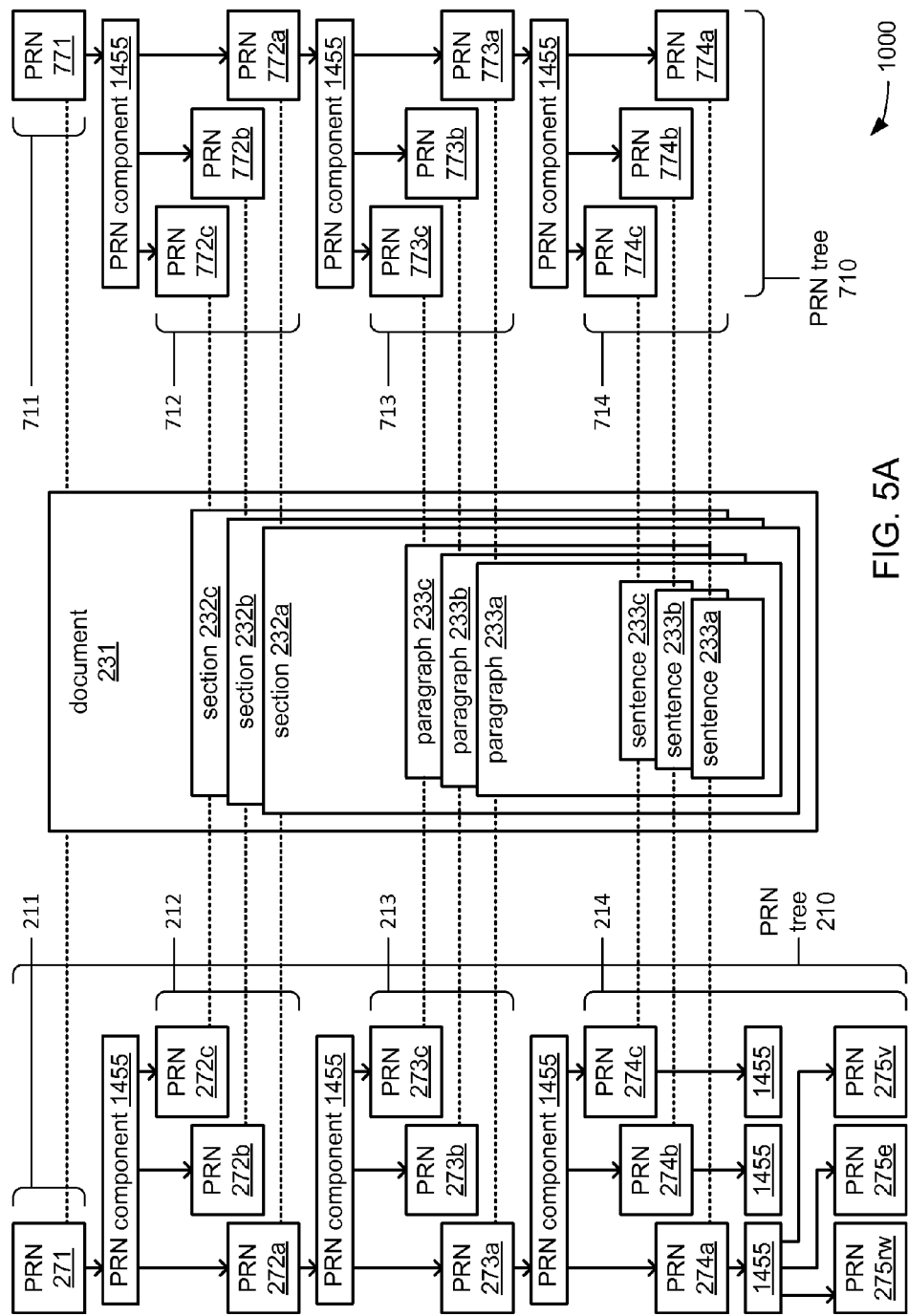
FIGS. 5A, 5B, 5C and 5D, together, illustrate another example embodiment of preparing data for storage.

FIG. 5A illustrates an example embodiment of generation by the tree component 1452 of a PRN tree 710 in addition to the PRN tree 210, as well as the generation of PRNs in a manner that follows the branching structures of both PRN trees. As depicted, the branching structure of the PRN tree 710, like that of the PRN tree 210, is generated to follow the manner in which the portions 237 are organized within the example document 231. Thus, the PRN trees 210 and 710 are parallel PRN trees in which there is a one-to-one correspondence between their top branching nodes 211 and 711, their branching nodes 212 and 712, their branching nodes 213 and 713, and their leaf nodes 214 and 714, respectively. As also depicted, the branching structures of the PRN trees 210 and 710 may both be employed in determining the chains of PRNs that extend from the top branching nodes at the top level of each of these PRN trees and to the leaf nodes towards the bottom of each of these PRN trees. However, as depicted, there may be differences in the PRNs associated with the leaf nodes 214 and 714. More specifically, as was discussed and earlier depicted in FIG. 3E, the PRNs 274 within each of the leaf nodes 214 may be employed as seed values for the generation of still further PRNs 275rw, 275e and 275v that are also associated with each of the leaf nodes 214. In contrast, in a manner more resembling what is depicted in FIG. 3C, the PRNs 774 may not be so used as seed values.

Figure 5B:
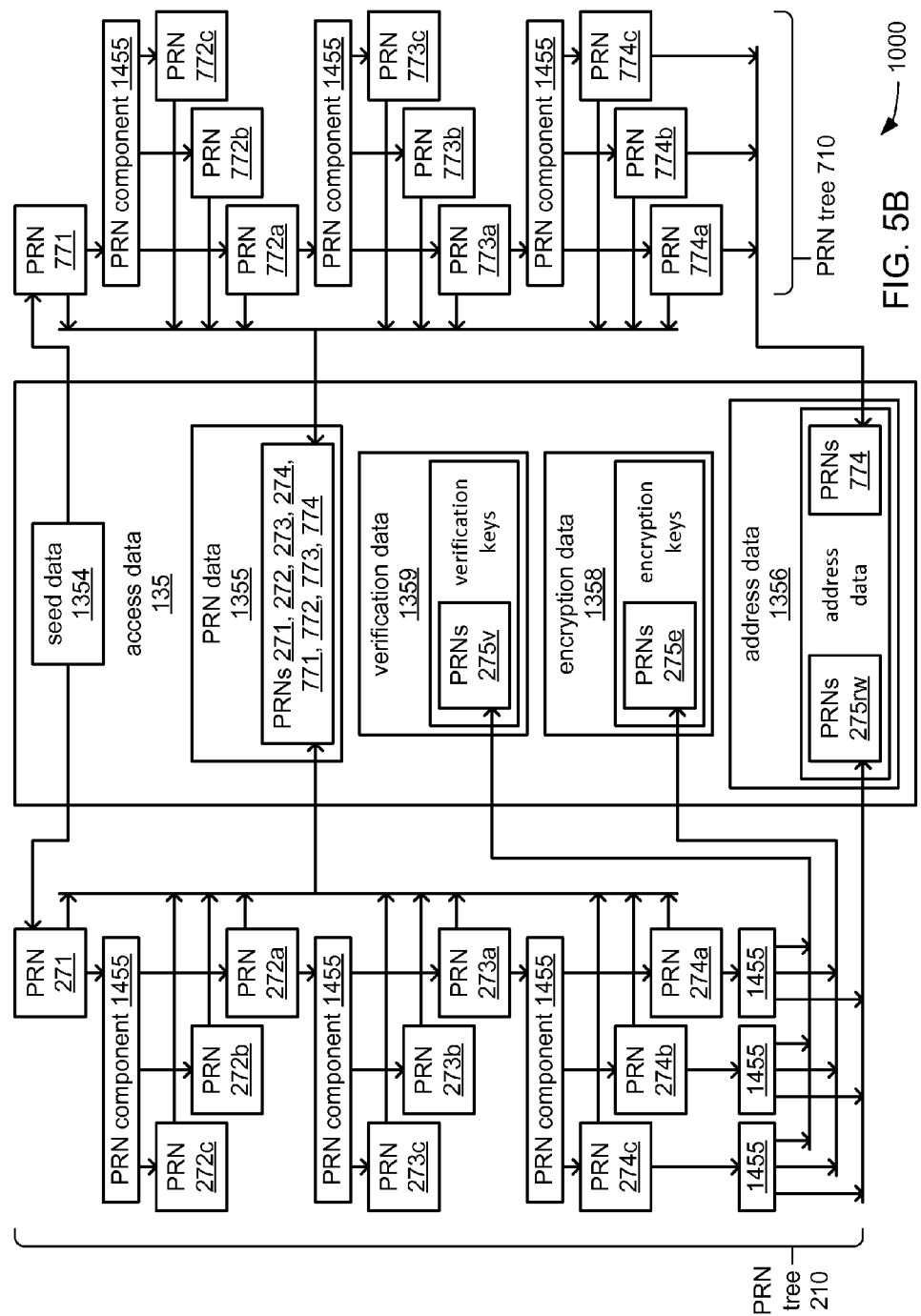

FIG. 5B illustrates an example embodiment of the manner in which the PRN values associated with the leaf nodes 214 and 714 of the PRN trees 210 and 710, respectively, may be employed in controlling various aspects of accessing the portions 237 of the example document 231. As was discussed and earlier depicted in FIG. 3E, the PRNs 275e and 275v may be stored and/or employed as encryption keys and verification keys, respectively, for encrypting and verifying the integrity of corresponding ones of the portions 237. Alternatively, many of the PRNs of one or both of the PRN trees 210 and 710 may be re-derived through pseudo-random number generation as needed. Also in a manner similar to what was discussed and earlier depicted in FIG. 3E, addresses at which each of the portions 237 are to be made accessible may be based on the PRNs 275rw derived within the branching structure of the PRN tree 210. However, in a manner similar to what was discussed and earlier depicted in FIG. 3C, those same addresses may also be based on the PRNs 774 derived within the branching structure of the PRN tree 710.

Figure 5C:
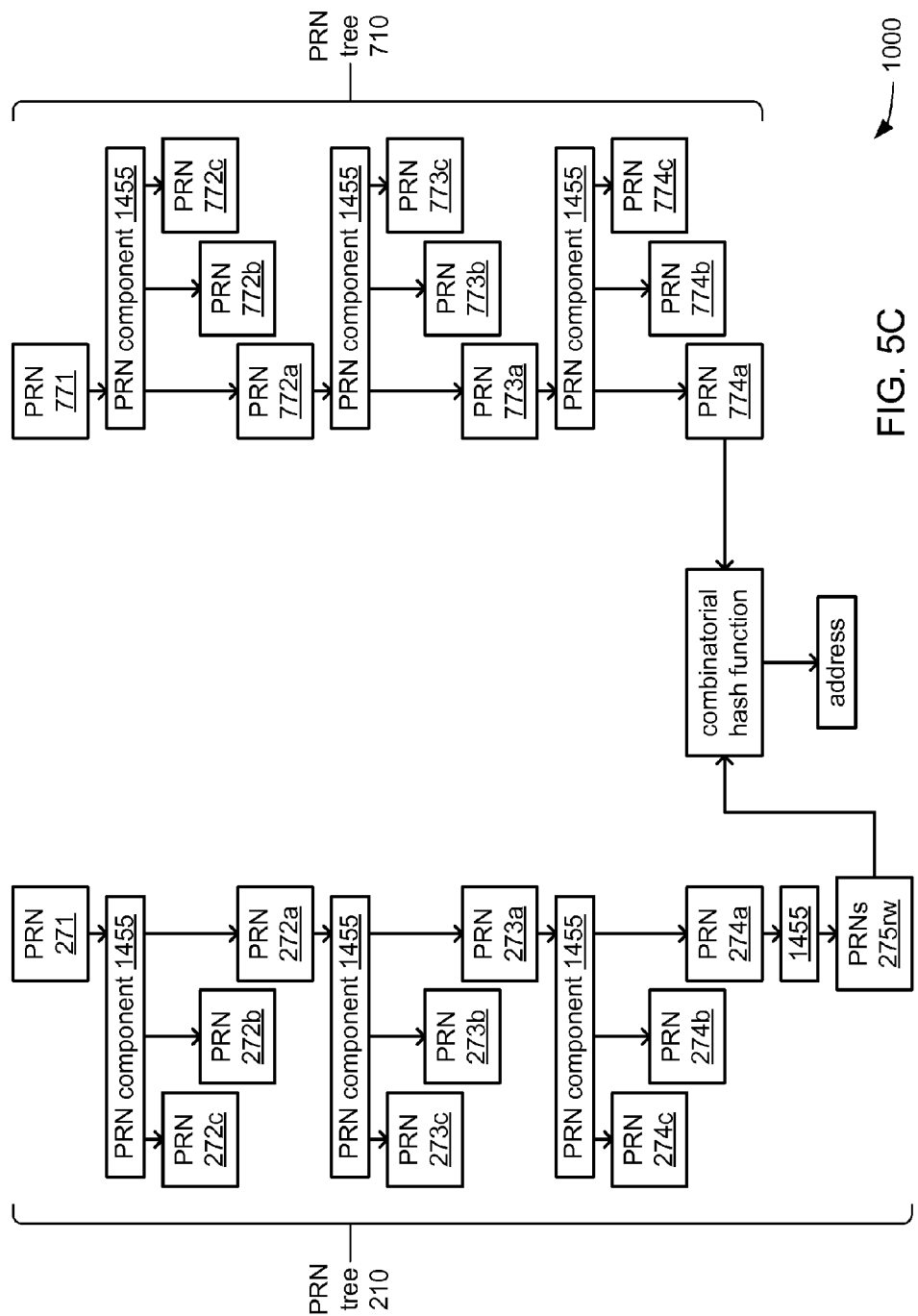

More precisely, and as depicted in FIG. 5C, the addresses at which each of the portions 237 are to be made accessible on the network 999 may be based on both of the PRNs 275rw and 774 associated with each of the portions 237. As depicted, for each portions 237, the PRN 275rw of its associated one of the leaf nodes 214 and the PRN 774 of it associated one of the leaf nodes 714 may be combined using any of a variety of functions from which a hash of the resulting combination is taken. The value of that hash may be defined to have a bit width similar to, if not identical to, the bit widths of the PRNs discussed herein and/or of the seed values from which those PRNs are derived. Thus, in a manner similar to what has been discussed with regard to using PRNs directly as addresses, the resulting hash value may be employed as an address having a value within a vast range of possible address values of a sparse addressing scheme.

Figure 5D:
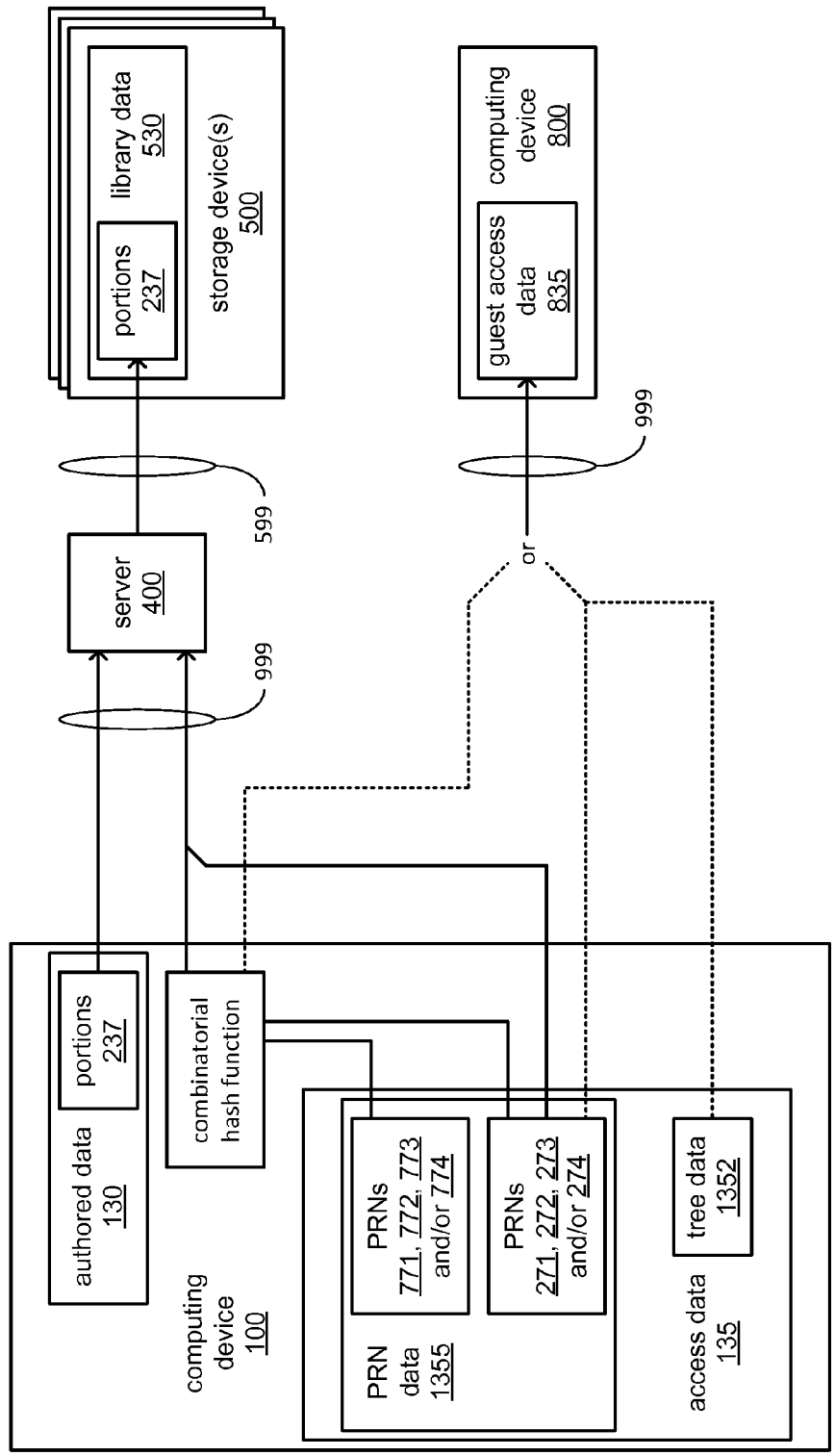

FIG. 5D illustrates an example of provisioning of the server 400 with the portions 237 and/or provisioning the computing device 800 with information required to retrieve one or more of the portions 237 from the server 400 in a manner in which both the scope and type of access granted to the computing device 800 is controlled. As depicted, the computing device 100 may transmit the portions 237 into which the example document 231 was earlier divided to the server 400. Before doing so, the computing device 100 may employ the PRNs 275e associated with the portions 237 to encrypt them. The computing device 100 may also transmit to the server 400 addresses derived as combinatorial hashes of the PRNs 275rw and 774 of each of the nodes 214 and 714, respectively, corresponding to each of the portions 237 that are transmitted to the server 400. The computing device 100 may further transmit indications of which of the portions 237 correspond to which of the PRNs 275rw and 774. Alternatively, the portions 237, the PRNs 275rw and the PRNs 774 may be transmitted in an order that implies the correlations therebetween.

In response to receiving the portions 237 and the corresponding addresses so generated as hashes of combinations of corresponding PRNs 275rw and 774, the server 400 may store each of the portions 237 within available storage locations within one or more of the storage devices 500. Then, for each of the stored portions 237, the server 400 may assign the corresponding address to the storage location within which that portion 237 is stored and at which that portion 237 is to be made accessible to other computing device through the network 999.

Following such provision of the portions 237 to the server 400 for storage, the operator of the computing device 100 may wish to grant both read and write access to the operator of the computing device 800 to one or more of the portions 237. The operator of the computing device 100 may do so by operating the computing device 100 to transmit to the computing device 800 one of the PRNs 271, 272, 273 or 274 associated with a node of the PRN tree 210 that provides the scope of access to the example document 231 that is to be granted along with one of the PRNs 771, 772, 773 or 774 from a corresponding node of the PRN tree 710. Upon receiving such a pair of corresponding PRNs, the computing device 800 may be operated to employ the corresponding PRNs as seeds to pseudo-randomly generate further PRNs, depending on the location of the nodes to which each PRN corresponds within the PRN trees 210 and 710, including one or both of the PRNs 275rw and 774 associated with one or more leaf nodes 214 and 714, respectively, that fall within the scope of the granted access.

By way of example, where the received pair of corresponding PRNs are associated with a pair of corresponding branching nodes within the PRN trees 210 and 710, both PRNs may be employed as seeds to derive one or more other PRNs associated with the branching nodes and/or leaf nodes that depend from the pair branching nodes that correspond with which the received pair of PRNs. Upon obtaining the PRNs 274 and 774 of one or more of the leaf nodes 214 and 714 that fall within the scope of granted access, the one or more PRNs 274 of the one or more leaf nodes 214 may be employed as seeds to generate at least the PRNs 275rw and 275e for each of the one or more leaf nodes 214.

To enable such derivation of PRNs by the computing device 800, the computing device 100 may also transmit an indication of the branching structure shared by both of the trees 210 and 710 as retrieved from the tree data 1352 to the computing device 800. Alternatively or additionally, the computing device 100 may transmit an indication retrieved from the PRN data 1355 of the particular pseudo-random number generation algorithm to be employed in generating the PRNs 271, 272, 273, 274, 275, 771, 772, 773 and/or 774. Following such derivation of the PRNs 275rw and 774 for each of the one or more portions 237, the computing device 800 may take combinatorial hashes of each of the PRNs 275rw and 774 for each such portion 237 to generate the address at which each such portion 237 is made accessible by the server 400. The computing device 800 may then transmit a request to the server 400 via the network 999 for access to the one or more portions 237 in which the one or more portions 237 are referred to by their corresponding addresses so generated from the PRNs 275rw and 774. The request for access may be for either read or write access.

In response, the server 400 may first determine whether each of the received addresses is of a storage location that exists within the one or more storage devices 500. For each storage location that does exist, then the server 400 may retrieve that portion 237 for where the request is a read access or allow writing to that portion 237 where the request is a write access. However, if a one or more of the addresses points to a storage location that does not exist, and if the requested access is a read access, then the server 400 may transmit randomly generated data values back to the computing device 800 as a response in a manner intended to mimic the provision of legitimate data back to the computing device 800. This may be deemed a preferable response to providing the computing device 800 with an indication of an error to further frustrate efforts made from other computing devices to search for data by forcing those computing devices to take the time to analyze the randomly generated data to attempt to discern whether it is real data, or not.

Where the request made by the computing device 800 to the server 400 was a write access request, the computing device 800 may receive some form of acknowledgement of a successful write to the one or more portions 237 included in the request. Where the request made by the computing device 800 to the server 400 was a read access request, and where the one or more portions 237 included in the request are encrypted, the computing device 800 may use the PRN 275e generated by the computing device 800 for each such portion 237 to decrypt it.

However, if the operator of the computing device 100 wishes to grant only read access to the operator of the computing device 800 to the same one or more portions 237, the operator of the computing device 100 may operate the computing device 100 to transmit to the computing device 800 only the one of the PRNs 271, 272, 273 or 274 associated with the node of the PRN tree 210 that defines the scope of the access to be granted, but not transmit the one of the PRNs 771, 772, 773 or 774 associated with the corresponding node of the PRN tree 710 to the computing device 800. Upon receiving the PRN from the PRN tree 210 without a corresponding PRN from the PRN tree 710, the computing device 800 may be operated to employ the received PRN as a seed to derive at least one or more PRNs 275rw of the one or more of the portions 237 included within the scope of the granted access, depending on the location of the node to which the PRN corresponds within the PRN tree 210.

Again, to enable such derivation of PRNs by the computing device 800, the computing device 100 may also transmit an indication of the branching structure of the PRN tree 210 and/or an indication of the particular pseudo-random number generation algorithm to be employed in generating the PRNs 271, 272, 273, 274 and/or 275rw to the computing device 800. Since the computing device 800 is provided only with PRN(s) for the PRN tree 210 associated with read access, but no PRNs for the PRN tree 710 associated with some form of write access, the only request that the computing device 800 is given the requisite information to make is a read access request to read the one or more portions 237 within the scope of access that has been granted to the computing device 800. Following such derivation of the PRNs 275rw, the computing device 800 may so transmit a read access request to the server 400 via the network 999 to read one or more of the portions 237 that fall within that granted scope of access. In that request, the computing device 800 may include the PRNs 275rw of the one or more portions 237 that the computing device 800 includes in that request. The computing device 800 may also transmit an indication of the location within the branching structure of the PRN tree 710 of each of the leaf nodes 714 that correspond to each of the one or more portions 237 included in the request. Such an indication may include a description provided in any of a variety of forms of the path to be taken through the branching structure from the top branching node 711 to the leaf node 714 that corresponds to each of the one or more portions 237 included in the request. Thus, unless the scope of access granted to the computing device 800 includes the entirety of the example document 231, the server 400 is not presented with an indication of the entire branching structure of the PRN tree 710, which may be deemed desirable as a further security precaution.

In response to receipt of the request for read access, the server 400 may employ each of the indications of a path through the branching structure of the PRN tree 710 for each leaf node 714 that corresponds to one of the portions 237 included in the read access request to pseudo-randomly generate the corresponding PRN 774 from the PRN 771 that corresponds to the top branching node 711 at the top of the PRN tree 710. To enable the server 400 to do so, the computing device 100 may have also transmitted the PRN 771 to the server 400 along with the portions 237 and corresponding addresses. Further, in pseudo-randomly generating each of the PRNs 774, the server 400 may employ hardware-based pseudo-random generation capabilities of the RNG 455 increase the speed with which the server 400 so generates the PRNs 774. Having derived the PRNs 774 of the leaf nodes 714 that correspond to each of the portions 237 included in the read access request, the server 400 may then take combinatorial hashes of corresponding pairs of the PRNs 275rw included in the read access request and the PRNs 774 derived by the server 400 to derive the addresses of the portions 237 included in the read access request. In essence, the server 400 recreates the addresses that the computing device 800 was not able to provide as part of not having been granted any other type of access than read-only. The server 400 may first determine whether the address just derived from the combinatorial hash function is of a storage location that exists within the one or more storage devices 500. If such a storage location does exist, then the server 400 may retrieve that portion 237 and transmit it back to the computing device 800 as part of satisfy the read access request. Again, if a storage location does not exist, then the server 400 may provide randomly generated data back to the computing device 800 as an additional security measure.

Although the server 400 may allow the computing device 800 to have read access to one or more of the portions 237 through use of only the PRNs 275rw and indications of paths through branching structures, the server 400 may require that the computing device 800 request write access to any portion 237 with a request that includes a combinatorial hash generated from both of the corresponding PRN 275rw of the PRN tree 210 associated with read accesses and the corresponding PRN 774 of the PRN tree 710 associated with write accesses. It is in this way that control is maintained over the types of access that may be granted.

Figure 6:
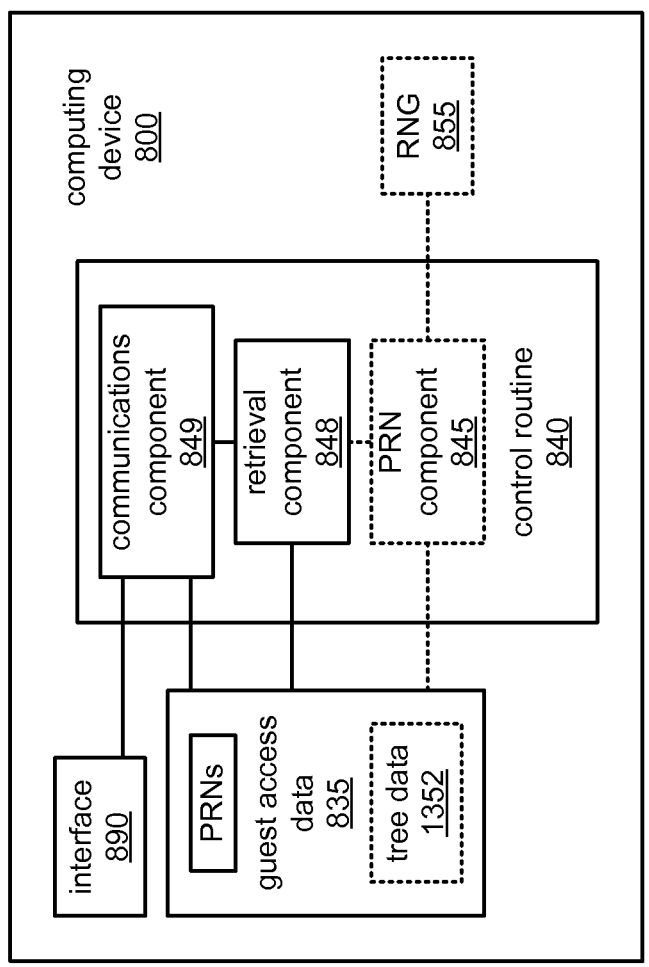
FIG. 6 illustrates an example embodiment of a computing device to securely access data through a network.

FIG. 6 illustrates a portion of an embodiment of the data storage system 1000, including aspects of an operating environment of the computing device 800 in which the processor component 850 executes the control routine 840 to request access to one or more portions 237 of the example document 231. As depicted, the control routine 840 may include one or more of a retrieval component 848, a PRN component 845 and a communications component 849. In executing the control routine 840, the processor component 850 may execute one or more of the components 845, 848 and 849.

Continuing with the example of the document 231 divided into the portions 237 for storage, in executing the communications component 849, the processor component 850 may operate the interface 890 to receive one or more PRNs 271, 272, 273, 274, 771, 772, 773 and/or 774 defining a scope that includes one or more leaf nodes 214 and/or 714 as part of granting access to one or more corresponding portions 237. The communications component 849 may store indications of such PRNs as part of the guest access data 835, and may do so along with other information that may be required in preparing to request access to one or more of the portions 237, including and not limited to an indication of the branching structure shared by the PRN trees 210 and 710 retrieved from the tree data 1352 provided by the computing device 100.

In subsequently executing the retrieval component 848, the processor component 850 may operate the interface 890 to transmit a request to the server 400 for access to one or more of the portions 237 to which the computing device 800 may have been given access by the computing device 100. Where the computing device 100 provided PRNs associated with the leaf nodes of the PRN trees 210 and/or 710, then the processor component 850 may include those PRNs in the request to individually specify one or more of the portions 237 to which access is requested. However, where the computing device 100 provided one or more PRNs associated with a branching node in lieu of providing PRNs associated with a leaf node of at least one of the PRN trees 210 and 710, then the PRN component 845 may be triggered to use such PRNs associated with branching nodes to pseudo-randomly generate the PRNs 275*rw* and/or 274 associated with leaf nodes that depend therefrom.

In executing the PRN component 845, the processor component 850 may employ a PRN associated with a branching node of a PRN tree as a seed to pseudo-randomly derive one or more further PRNs, including one or more PRNs associated with one or more leaf nodes. In so doing, the processor component may employ the RNG 855 (if present), which may include electronic circuitry implementing at least a portion of one or more pseudo-random number generation algorithms to increase the speed with which the derivation of the further PRNs is performed.

Returning to FIG. 1, more generally, each of the devices 100, 400, 500 and 800 may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a smart card incorporating a processor component, a body-worn computing device incorporated into clothing, a computing device integrated into a vehicle (e.g., a car, a bicycle, a wheelchair, etc.), a server, a cluster of servers, a server farm, etc.

In various embodiments, each of the processor components 150, 450 and 850 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 160, 460 and 860 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, at least a portion of each of the interface(s) 190, 490 and 890 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 7:
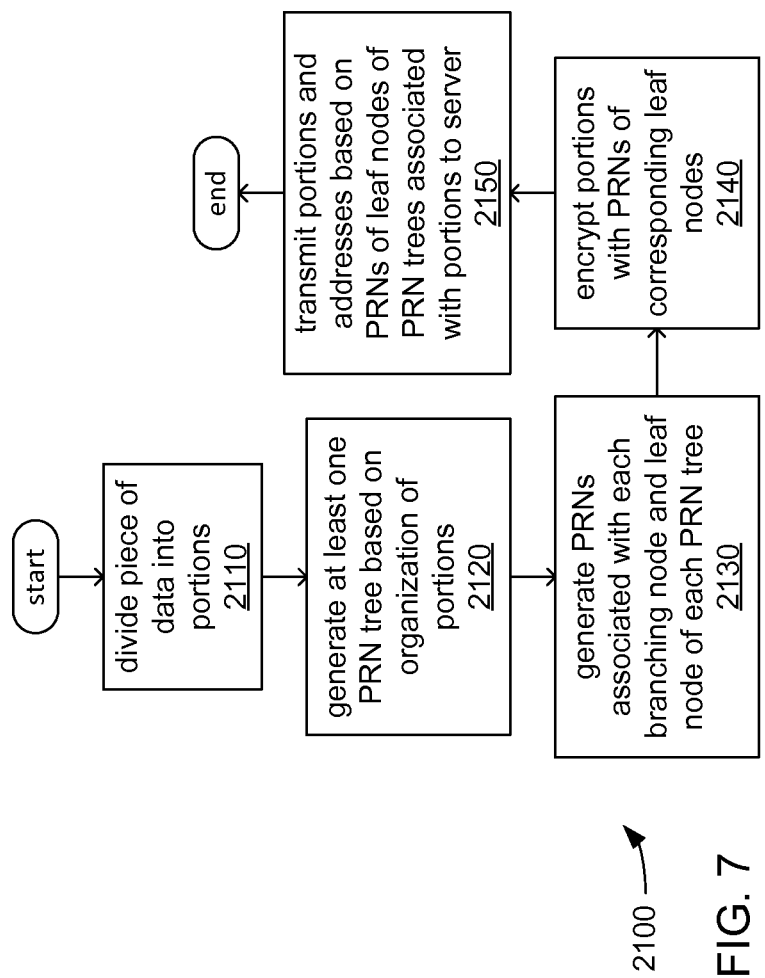
FIGS. 7, 8 and 9 each illustrate a logic flow according to an embodiment.

FIG. 7 illustrates an embodiment of a logic flow 2100. The logic flow 2100 may be representative of some or all of the operations executed by one or more embodiments described herein. More specifically, the logic flow 2100 may illustrate operations performed by the processor component 150 in executing at least the control routine 140, and/or performed by other component(s) of the computing device 100.

At 2110, a processor component of a computing device (e.g., the processor component 150 of the computing device 100) may divide a piece of data into multiple portions (e.g., the example document 231 divided into multiple portions 237). As has been discussed, such division of a piece of data into portions may be guided by interaction with an operator of the computing device, or may be carried out entirely automatically by examining aspects of the piece of data for locations at which to divide it, such as formatting of text, locations of figures amidst other types of data, pauses of silence in audio recordings, scene changes in motion videos, etc.

At 2120, the processor component may generate one or more PRN trees based on the manner in which the portions just created are organized within the piece of data. As has been discussed, there may be only a single PRN tree (e.g., the PRN tree 210) where the type of access granted to one or more of the portions is not controlled, or there may be at least one additional parallel tree with the same branching structure (e.g., the PRN tree 710) where the type of access is controlled. In embodiments in which there are multiple parallel PRN trees generated, one may be associated with read access while another may be associated with a type or degree of access that includes modification of one or more of the portions as stored.

At 2130, the processor component may generate PRNs associated with each branching node (e.g., the branching nodes 212, 213, 712 and 713) and leaf node (e.g., the leaf nodes 214 and 714) of each PRN tree. As has been discussed, such PRNs may be generated starting with the PRN associated with the top branching node at the top level of a PRN tree, progressing downward through all of the branching nodes in the intermediate levels of the PRN tree, and to the leaf nodes towards the bottom level of the PRN tree. In so doing, PRNs at each node are derived pseudo-randomly using the PRN of the node in the level above from which the node depends as a seed value.

At 2140, the processor component 150 may encrypt each of the portions using one of the PRNs associated with each of the corresponding leaf nodes that was generated for use as an encryption key. At 2150, the processor component 150 may transmit each of the now encrypted portions to a server for storage along with corresponding addresses based on corresponding PRNs of corresponding leaf nodes of the one or more PRN trees. As has been discussed, for each portion, its corresponding address may be generated as a hash value taken of a combination of the PRNs of the leaf nodes that correspond to that portion.

Figure 8:
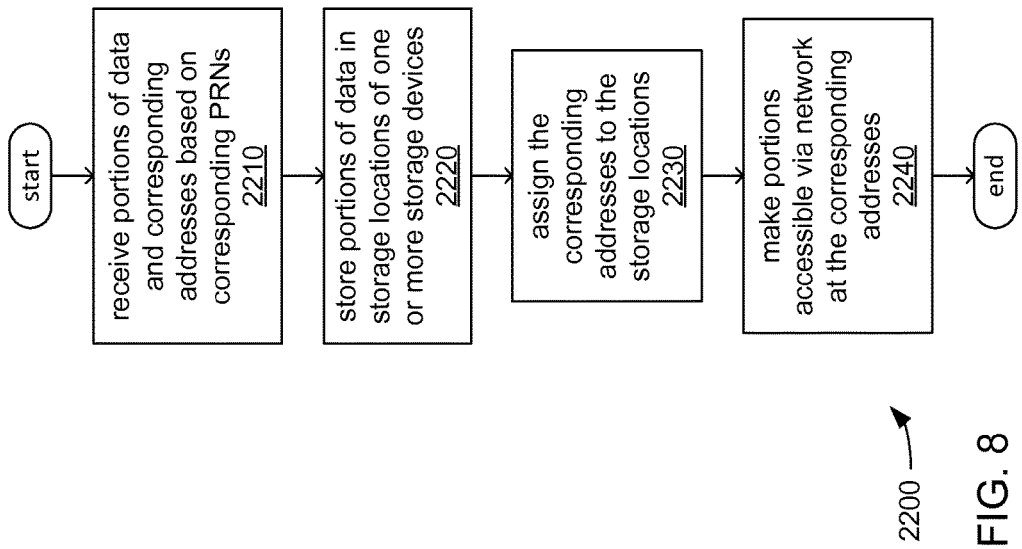

FIG. 8 illustrates an embodiment of a logic flow 2200. The logic flow 2200 may be representative of some or all of the operations executed by one or more embodiments described herein. More specifically, the logic flow 2200 may illustrate operations performed by the processor component 450 in executing at least the control routine 440, and/or performed by other component(s) of the server 400.

At 2210, a processor component of a server (e.g., the processor component 450 of the server 400) may receive portions of data to be stored by the server and accompanied by corresponding addresses at which the portions are to be stored and at which the portions are to be made accessible through a network. As previously discussed, the addresses may be PRNs taken directly from a single PRN tree in embodiments in which there is only a single PRN tree (e.g., the PRNs 274 or 275rw associated with the leaf nodes 214 of the PRN tree 210). Alternatively, in embodiments in which there is more than one PRN tree as part of an approach to controlling the types of access that may be granted, each address may be generated as a hash value taken from a combination of multiple PRNs from leaf nodes of multiple PRN trees that correspond to each portion (e.g., PRNs 275rw and 774 from the leaf nodes 214 and 714 of the PRN trees 210 and 710, respectively).

At 2220, the processor component may store each of the portions within a storage space of one or more storage devices. At 2230, the processor component may assign corresponding ones of the addresses to the storage locations in which corresponding portions of data are stored. At 2240, the processor component may make each of the portions of data accessible through a network at the corresponding addresses. As previously discussed, any of a variety of network protocols may be used to enable the use of such addresses in requesting access to one or more of the portions.

Figure 9:
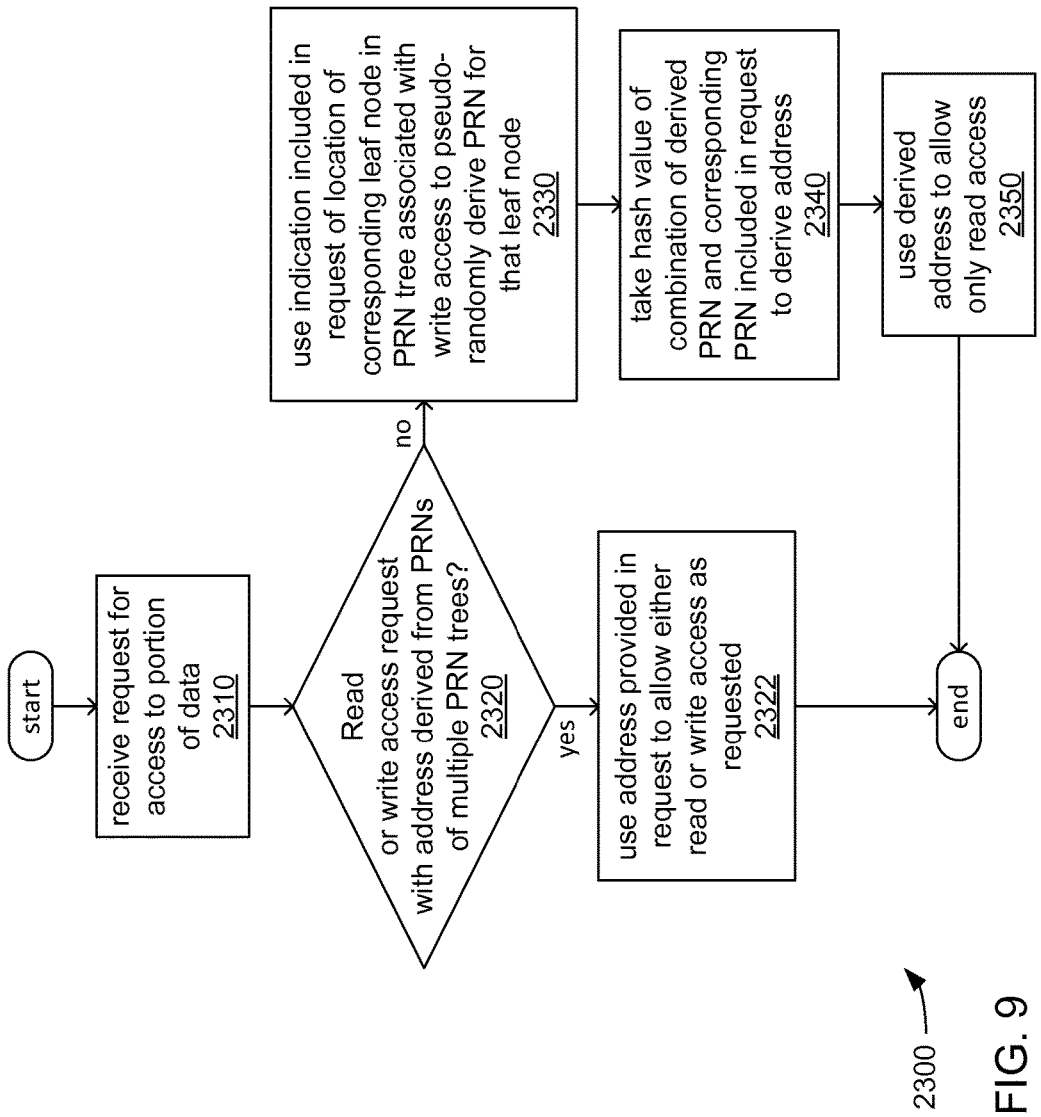

FIG. 9 illustrates an embodiment of a logic flow 2300. The logic flow 2300 may be representative of some or all of the operations executed by one or more embodiments described herein. More specifically, the logic flow 2300 may illustrate operations performed by the processor component 450 in executing at least the control routine 440, and/or performed by other component(s) of the server 400.

At 2310, a processor component of a server (e.g., the processor component 450 of the server 400) may receive through a network a request for access a portion of a piece of data (e.g., one or more portions 237 of the example document 231). As has been discussed, the piece of data may be any of a wide variety of types of data.

At 2320, a check may be made by the processor component as to whether the request includes an address for that portion that is derived from PRNs of corresponding leaf nodes of multiple PRN trees that are each associated with a different type of access. As has been discussed, in embodiments in which there are multiple parallel PRN trees that are each associated with a different type of access to the same portions of the same piece of data, PRNs from corresponding leaf nodes of each of the multiple parallel PRN trees may be combined and a hash value may be taken of that combination to derive the address for each portion. If, at 2320, such an address is provided for the portion, then the processor component may use that address to provide the read or write access that is requested.

However, if at 2320, there is only a PRN value of a corresponding leaf node of PRN tree associated only with read access, then at 2330, the processor component may employ an indication of the location of a different corresponding leaf node within the branching structure of another PRN tree that associated with write access that includes the ability to modify data to pseudo-randomly generate the PRN of that other corresponding leaf node from a PRN associated with the top branching node of that other PRN tree. As has been discussed, in so doing, the processor component may pseudo-randomly generate a chain of PRNs using the PRN associated with the top branching node as a seed to generate a PRN of a branching node in the next layer down from the top layer of the top branching node, then using that PRN as a seed to generate a further PRN, and so on until the PRN associated with the leaf node is generated using the PRN of the branching node above it as the seed to do so.

At 2340, the processor component may take a hash value of a combination of the PRN received in the request that corresponds to the leaf node of the PRN tree associated with read access and the just generated PRN that corresponds to the leaf node of the PRN tree associated with write access. At 2350, the processor component may then use that hash value as the address at which to access the portion, and may retrieve that portion therefrom to satisfy the read request. However, the processor component may take the inability of the requesting device to directly provide the hash value as an indication that the type of access granted to that device does not include write access, and therefore, the processor component may not allow any other type of access to the portion by the requesting device beyond a read access.

Figure 10:
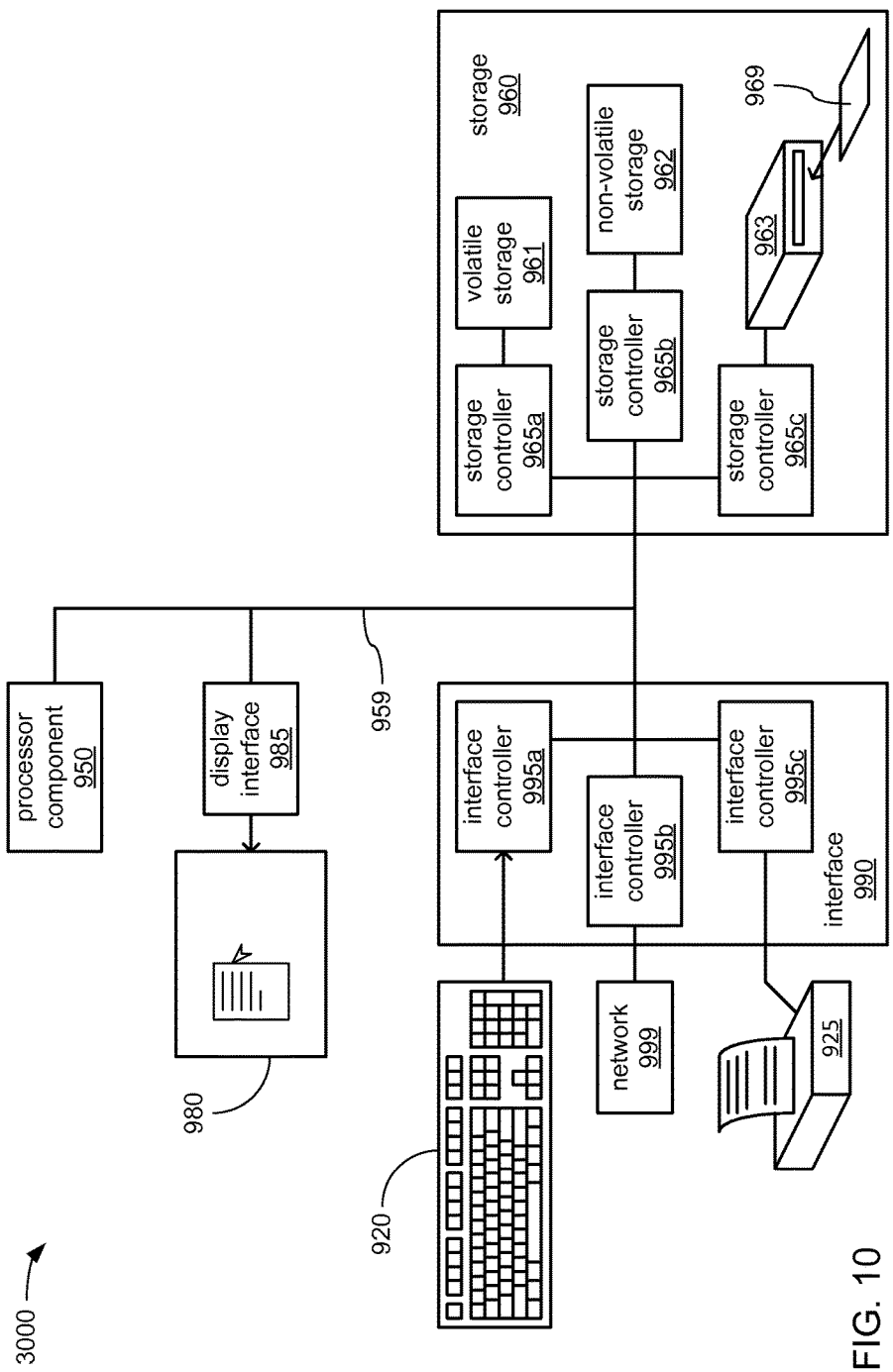
FIG. 10 illustrates a processing architecture according to an embodiment.

FIG. 10 illustrates an embodiment of an exemplary processing architecture 3000 suitable for implementing various embodiments as previously described. More specifically, the processing architecture 3000 (or variants thereof) may be implemented as part of one or more of the computing devices 100, 400 or 800. It should be noted that components of the processing architecture 3000 are given reference numbers in which the last two digits correspond to the last two digits of reference numbers of at least some of the components earlier depicted and described as part of the computing devices 100, 400 and 800. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (which may correspond to the processor component 450) may include any of a wide variety of commercially available processors, employing any of a wide variety of technologies and implemented with one or more cores physically combined in any of a number of ways.

As previously discussed, the storage 960 (which may correspond to the storage 460) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interface(s) 490) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). More specifically, the interface controller 995b may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The detailed disclosure now turns to providing examples that pertain to further embodiments. The examples provided below are not intended to be limiting.

In Example 1, an apparatus includes logic, at least a portion of which is implemented in hardware, the logic to include an apportioning component to divide an item of data into multiple portions based on an organizational structure of the item of data; a tree component to generate a first pseudo-random number (PRN) tree to include a first multitude of nodes and a branching structure based on the organizational structure of the item of data, the first multitude of nodes to include at least one branching node at which branching occurs and multiple leaf nodes of which each leaf node corresponds to a portion of the multiple portions; a PRN component to generate a PRN for each node of the first multitude of nodes, the PRN component to use a PRN of a branching node of the first PRN tree to generate a PRN for a leaf node that depends from the branching node; and a communications component to transmit the multiple portions and multiple addresses based on PRNs of leaf nodes of the first PRN tree to a server via a network to enable the server to store each portion at an address of the multiple addresses.

In Example 2, which includes the subject matter of Example 1, the tree component may generate a top branching node of the at least one branching node at a top of the first PRN tree and may generate the leaf nodes to depend from the at least one branching node and extend towards a bottom of the first PRN tree, and the PRN component may generate a PRN for a branching node that depends from the top branching node using the PRN of the top branching node as a seed value.

In Example 3, which includes the subject matter of any of Examples 1-2, the PRN component may use a PRN of a leaf node as a seed to generate an encryption PRN for the leaf node, and the apparatus may include an encryption component to use the encryption PRN as an encryption key to encrypt the portion of the multiple portions that corresponds to the leaf node prior to transmitting the portion to the server.

In Example 4, which includes the subject matter of any of Examples 1-3, the apparatus may include the PRN component may use the PRN of the leaf node as a seed to generate a verification PRN for the leaf node, and the apparatus may include a verification component to take a first cryptographic hash of the portion using the verification PRN as an input to a cryptographic hash function following encryption of the portion In Example 5, which includes the subject matter of any of Examples 1-4, the communications component may transmit a request to the server for access to the portion that corresponds to the leaf node, the verification component may take a second cryptographic hash of the portion as received from the server and may compare the first and second cryptographic hashes to verify the integrity of the portion as received from the server, and the encryption component may use the encryption PRN to decrypt the portion following verification of the integrity of the portion.

In Example 6, which includes the subject matter of any of Examples 1-5, the communications component may transmit a first PRN of a branching node of the first PRN tree and an indication of the branching structure to a computing device to grant the computing device a first type of access to a portion of the multiple portions as stored by the server by enabling the computing device to use the first PRN as a seed to generate at least a PRN of the leaf node of the first PRN tree that corresponds to the portion for use by the computing device as an address in a request transmitted to the server for the first type of access to the portion, and the branching structure of the first PRN tree and the selection of the branching node of the first PRN may cooperate to define a scope of the first type of access granted to the computing device.

In Example 7, which includes the subject matter of any of Examples 1-6, at least a portion of the organizational structure of the item of data may be indicated in at least one portion of the multiple portions transmitted to the server.

In Example 8, which includes the subject matter of any of Examples 1-7, the tree component may generate a second PRN tree to include a second multitude of nodes and the branching structure of the first PRN tree, the second multitude of nodes may include at least one branching node at which branching occurs and multiple leaf nodes of which each leaf node corresponds to a portion of the multiple portions, the at least one branching node may include a top branching node at a top of the second PRN tree, the leaf nodes may depend from the at least one branching node and extend towards a bottom of the second PRN tree, the PRN component may generate a PRN for each node of the second multitude of nodes and may use the PRN of a branching node of the second PRN tree as a seed to generate a PRN for a leaf node that depends from the branching node, and the communications component may transmit a PRN of the top branching node to the server to enable the server to use the PRN of the top branching node to generate at least a PRN of a leaf node of the second PRN tree that corresponds to the portion.

In Example 9, which includes the subject matter of any of Examples 1-8, the communications component may transmit to the computing device a second PRN of a branching node of the second PRN tree that corresponds to the branching node of the first PRN tree that corresponds to the first PRN to grant the computing device a second type of access to the portion by enabling the computing device to use the second PRN as a seed to generate at least a PRN of the leaf node of the second PRN tree that corresponds to the portion for use by the computing device to request the second type of access to the portion in addition to the first type of access.

In Example 10, which includes the subject matter of any of Examples 1-9, the first type of access may include read access and the second type of access may include access to modify data.

In Example 11, which includes the subject matter of any of Examples 1-10, the item of data may include at least one of text, a table, a still image, a chart, a graph, motion video, audio, an equation, biometric data, a genetic sequence, financial data, statistical data, behavioral data, location data or spending data.

In Example 12, which includes the subject matter of any of Examples 1-11, a portion of the multiple portions may include at least one of a letter, a word, a sentence, a paragraph, a page, a table, a still image, a chart, a graph, a frame of motion video or a portion of recorded audio.

In Example 13, which includes the subject matter of any of Examples 1-12, the apportioning component may divide the item of data into the multiple portions based on at least one of text formatting, instances of silence in an audio recording or scene changes in a motion video.

In Example 14, which includes the subject matter of any of Examples 1-13, the organizational structure of the item of data may be based on a hierarchy of units of time and the apportioning component may divide the item of data into multiple portions based on a progression of time.

In Example 15, which includes the subject matter of any of Examples 1-14, the logic may include a random number generator (RNG) that may include circuitry to generate a seed value based on at least one of a quantum effect or a noise source, the PRN component may trigger the RNG to generate the seed value, and the PRN component may generate a PRN for a top branching node at a top of the first PRN tree from the seed value.

In Example 16, which includes the subject matter of any of Examples 1-15, the RNG may include circuitry to generate PRNs, and the PRN component may trigger the RNG to generate PRNs for each node of the first multitude of nodes.

In Example 17, a computing-implemented method includes dividing an item of data into multiple portions based on an organizational structure of the item of data; generating a first pseudo-random number (PRN) tree including a first multitude of nodes and a branching structure based on the organizational structure of the item of data, the first multitude of nodes including at least one branching node at which branching occurs and multiple leaf nodes of which each leaf node corresponds to a portion of the multiple portions; generating a PRN for each node of the first multitude of nodes, the PRN of a branching node of the first PRN tree used as a seed to generate a PRN for a leaf node that depends from the branching node; and transmitting the multiple portions and multiple addresses based on PRNs of leaf nodes of the first PRN tree to a server to enable the server to store each portion at an address of the multiple addresses.

In Example 18, which includes the subject matter of Example 17, the method may include generating a top branching node of the at least one branching node at a top of the first PRN tree; generating the leaf nodes to depend from the at least one branching node and to extend towards a bottom of the first PRN tree; and generating a PRN for a branching node that depends from the top branching node using the PRN of the top branching node as a seed value.

In Example 19, which includes the subject matter of any of Examples 17-18, the method may include generating an encryption PRN for the leaf node using a PRN of a leaf node as a seed value, and encrypting the portion of the multiple portions that corresponds to the leaf node using the encryption PRN as an encryption key prior to transmitting the portion to the server.

In Example 20, which includes the subject matter of any of Examples 17-19, the method may include generating a verification PRN for the leaf node using the PRN of the leaf node as a seed value; taking a first cryptographic hash of the portion using the verification PRN as an input to a cryptographic hash function following encryption of the portion; transmitting a request to the server for access to the portion that corresponds to the leaf node; taking a second cryptographic hash of the portion as received from the server following decryption; comparing the first and second cryptographic hashes to verify the integrity of the portion as received from the server; and decrypting the portion using the encryption PRN following verification of the integrity of the portion.

In Example 21, which includes the subject matter of any of Examples 17-20, the method may include transmitting a first PRN of a branching node of the first PRN tree and an indication of the branching structure to a computing device to grant the computing device a first type of access to a portion of the multiple portions as stored by the server by enabling the computing device to use the first PRN as a seed to generate at least a PRN of the leaf node of the first PRN tree that corresponds to the portion for use by the computing device as an address in a request transmitted to the server for the first type of access to the portion, the branching structure of the first PRN tree and the selection of the branching node of the first PRN cooperating to define a scope of the first type of access granted to the computing device.

In Example 22, which includes the subject matter of any of Examples 17-21, at least a portion of the organizational structure of the item of data may be indicated in at least one portion of the multiple portions transmitted to the server.

In Example 23, which includes the subject matter of any of Examples 17-22, the method may include generating a second PRN tree including a second multitude of nodes and the branching structure of the first PRN tree, the second multitude of nodes may include at least one branching node at which branching occurs and multiple leaf nodes of which each leaf node corresponds to a portion of the multiple portions, the at least one branching node may include a top branching node at a top of the second PRN tree and the leaf nodes depending from the at least one branching node and extending towards a bottom of the second PRN tree; generating a PRN for each node of the second multitude of nodes, the PRN of a branching node of the second PRN tree used as a seed to generate a PRN for a leaf node that depends from the branching node; and transmitting a PRN of the top branching node to enable the server to use the PRN of the top branching node to generate at least a PRN of a leaf node of the second PRN tree that corresponds to the portion.

In Example 24, which includes the subject matter of any of Examples 17-23, the method may include transmitting to the computing device a second PRN of a branching node of the second PRN tree that corresponds to the branching node of the first PRN tree that corresponds to the first PRN to grant the computing device a second type of access to the portion by enabling the computing device to use the second PRN as a seed to generate at least a PRN of the leaf node of the second PRN tree that corresponds to the portion for use by the computing device to request the second type of access to the portion in addition to the first type of access.

In Example 25, which includes the subject matter of any of Examples 17-24, the first type of access may include read access and the second type of access may include access to modify data.

In Example 26, which includes the subject matter of any of Examples 17-25, the item of data may include at least one of text, a table, a still image, a chart, a graph, motion video, audio, an equation, biometric data, a genetic sequence, financial data, statistical data, behavioral data, location data or spending data.

In Example 27, which includes the subject matter of any of Examples 17-26, a portion of the multiple portions may include at least one of a letter, a word, a sentence, a paragraph, a page, a table, a still image, a chart, a graph, a frame of motion video or a portion of recorded audio.

In Example 28, which includes the subject matter of any of Examples 17-27, the method may include dividing the item of data into the multiple portions based on at least one of text formatting, instances of silence in an audio recording or scene changes in a motion video.

In Example 29, which includes the subject matter of any of Examples 17-28, the organizational structure of the item of data may be based on a hierarchy of units of time, and the method may include dividing the item of data into multiple portions based on a progression of time.

In Example 30, which includes the subject matter of any of Examples 17-29, a bit width of the PRNs of the first PRN tree selected to be large enough to make guessing the addresses at which the server stores the portions prohibitively difficult to guess and may define a range of possible values for the addresses that is large enough to enable generation of the addresses without concern of competing with an address selected by another computing device.

In Example 31, at least one tangible machine-readable storage medium includes instructions that when executed by a processor component, may cause the processor component to divide an item of data into multiple portions based on an organizational structure of the item of data; generate a first pseudo-random number (PRN) tree to include a first multitude of nodes and a branching structure based on the organizational structure of the item of data, the first multitude of nodes to include at least one branching node at which branching occurs and multiple leaf nodes of which each leaf node corresponds to a portion of the multiple portions; generate a PRN for each node of the first multitude of nodes, the PRN of a branching node of the first PRN tree used as a seed to generate a PRN for a leaf node that depends from the branching node; and transmit the multiple portions and multiple addresses based on PRNs of leaf nodes of the first PRN tree to a server to enable the server to store each portion at an address of the multiple addresses.

In Example 32, which includes the subject matter of Example 31, the processor component may be caused to generate a top branching node of the at least one branching node at a top of the first PRN tree; generate the leaf nodes to depend from the at least one branching node and to extend towards a bottom of the first PRN tree; and generate a PRN for a branching node that depends from the top branching node using the PRN of the top branching node as a seed value.

In Example 33, which includes the subject matter of any of Examples 31-32, the processor component may be caused to generate an encryption PRN for the leaf node using a PRN of a leaf node as a seed value, and encrypt the portion of the multiple portions that corresponds to the leaf node using the encryption PRN as an encryption key prior to transmitting the portion to the server.

In Example 34, which includes the subject matter of any of Examples 31-33, the processor component may be caused to generate a verification PRN for the leaf node using the PRN of the leaf node as a seed value; take a first cryptographic hash of the portion using the verification PRN as an input to a cryptographic hash function following encryption of the portion; transmit a request to the server for access to the portion that corresponds to the leaf node; take a second cryptographic hash of the portion as received from the server following decryption; compare the first and second cryptographic hashes to verify the integrity of the portion as received from the server and decrypt the portion using the encryption PRN following verification of the integrity of the portion.

In Example 35, which includes the subject matter of any of Examples 31-34, the processor component may be caused to transmit a first PRN of a branching node of the first PRN tree and an indication of the branching structure to a computing device to grant the computing device a first type of access to a portion of the multiple portions as stored by the server by enabling the computing device to use the first PRN as a seed to generate at least a PRN of the leaf node of the first PRN tree that corresponds to the portion for use by the computing device as an address in a request transmitted to the server for the first type of access to the portion, the branching structure of the first PRN tree and the selection of the branching node of the first PRN to cooperate to define a scope of the first type of access granted to the computing device.

In Example 36, which includes the subject matter of any of Examples 31-35, at least a portion of the organizational structure of the item of data may be indicated in at least one portion of the multiple portions transmitted to the server.

In Example 37, which includes the subject matter of any of Examples 31-36, the processor component may be caused to generate a second PRN tree to include a second multitude of nodes and the branching structure of the first PRN tree, the second multitude of nodes to include at least one branching node at which branching occurs and multiple leaf nodes of which each leaf node corresponds to a portion of the multiple portions, the at least one branching node to include a top branching node at a top of the second PRN tree and the leaf nodes depending from the at least one branching node and extending towards a bottom of the second PRN tree; generate a PRN for each node of the second multitude of nodes, the PRN of a branching node of the second PRN tree used as a seed to generate a PRN for a leaf node that depends from the branching node; and transmit a PRN of the top branching node to the server to enable the server to use the PRN of the top branching node to generate at least a PRN of a leaf node of the second PRN tree that corresponds to the portion.

In Example 38, which includes the subject matter of any of Examples 31-37, the processor component may be caused to transmit to the computing device a second PRN of a branching node of the second PRN tree that corresponds to the branching node of the first PRN tree that corresponds to the first PRN to grant the computing device a second type of access to the portion by enabling the computing device to use the second PRN as a seed to generate at least a PRN of the leaf node of the second PRN tree that corresponds to the portion for use by the computing device to request the second type of access to the portion in addition to the first type of access.

In Example 39, which includes the subject matter of any of Examples 31-38, the first type of access may include read access and the second type of access may include access to modify data.

In Example 40, which includes the subject matter of any of Examples 31-39, the item of data may include at least one of text, a table, a still image, a chart, a graph, motion video, audio, an equation, biometric data, a genetic sequence, financial data, statistical data, behavioral data, location data or spending data.

In Example 41, which includes the subject matter of any of Examples 31-40, a portion of the multiple portions may include at least one of a letter, a word, a sentence, a paragraph, a page, a table, a still image, a chart, a graph, a frame of motion video or a portion of recorded audio.

In Example 42, which includes the subject matter of any of Examples 31-41, the processor component may be caused to divide the item of data into the multiple portions based on at least one of text formatting, instances of silence in an audio recording or scene changes in a motion video.

In Example 43, which includes the subject matter of any of Examples 31-42, the organizational structure of the item of data may be based on a hierarchy of units of time, and the method may include dividing the item of data into multiple portions based on a progression of time.

In Example 44, which includes the subject matter of any of Examples 31-43, a bit width of the PRNs of the first PRN tree may be selected to be large enough to make guessing the addresses at which the server stores the portions prohibitively difficult to guess and may define a range of possible values for the addresses that is large enough to enable generation of the addresses without concern of competing with an address selected by another computing device.

In Example 45, an apparatus includes a processor component; an apportioning component to divide an item of data into multiple portions based on an organizational structure of the item of data; a tree component to generate a first pseudo-random number (PRN) tree to comprise a first multitude of nodes and a branching structure based on the organizational structure of the item of data, the first multitude of nodes to comprise at least one branching node at which branching occurs and multiple leaf nodes of which each leaf node corresponds to a portion of the multiple portions; a PRN component to generate a PRN for each node of the first multitude of nodes, the PRN component to use a PRN of a branching node of the first PRN tree to generate a PRN for a leaf node that depends from the branching node; and a communications component to transmit the multiple portions and multiple addresses based on PRNs of leaf nodes of the first PRN tree to a server via a network to enable the server to store each portion at an address of the multiple addresses.

In Example 46, which includes the subject matter of Example 45, the tree component may generate a top branching node of the at least one branching node at a top of the first PRN tree and may generate the leaf nodes to depend from the at least one branching node and extend towards a bottom of the first PRN tree, and the PRN component may generate a PRN for a branching node that depends from the top branching node using the PRN of the top branching node as a seed value.

In Example 47, which includes the subject matter of any of Examples 45-46, the PRN component may use a PRN of a leaf node as a seed to generate an encryption PRN for the leaf node, and the apparatus may include an encryption component to use the encryption PRN as an encryption key to encrypt the portion of the multiple portions that corresponds to the leaf node prior to transmitting the portion to the server.

In Example 48, which includes the subject matter of any of Examples 45-47, the PRN component may use the PRN of the leaf node as a seed to generate a verification PRN for the leaf node, and the apparatus may include a verification component to take a first cryptographic hash of the portion using the verification PRN as an input to a cryptographic hash function following encryption of the portion.

In Example 49, which includes the subject matter of any of Examples 45-48, the communications component may transmit a request to the server for access to the portion that corresponds to the leaf node, the verification component may take a second cryptographic hash of the portion as received from the server and compare the first and second cryptographic hashes to verify the integrity of the portion as received from the server, and the encryption component may use the encryption PRN to decrypt the portion following verification of the integrity of the portion.

In Example 50, which includes the subject matter of any of Examples 45-49, the communications component may transmit a first PRN of a branching node of the first PRN tree and an indication of the branching structure to a computing device to grant the computing device a first type of access to a portion of the multiple portions as stored by the server by enabling the computing device to use the first PRN as a seed to generate at least a PRN of the leaf node of the first PRN tree that corresponds to the portion for use by the computing device as an address in a request transmitted to the server for the first type of access to the portion, the branching structure of the first PRN tree and the selection of the branching node of the first PRN to cooperate to define a scope of the first type of access granted to the computing device.

In Example 51, which includes the subject matter of any of Examples 45-50, the tree component may generate a second PRN tree to include a second multitude of nodes and the branching structure of the first PRN tree, the second multitude of nodes may include at least one branching node at which branching occurs and multiple leaf nodes of which each leaf node corresponds to a portion of the multiple portions, the at least one branching node may include a top branching node at a top of the second PRN tree, the leaf nodes may depend from the at least one branching node and extend towards a bottom of the second PRN tree, the PRN component may generate a PRN for each node of the second multitude of nodes and may use the PRN of a branching node of the second PRN tree as a seed to generate a PRN for a leaf node that depends from the branching node, and the communications component may transmit a PRN of the top branching node to the server to enable the server to use the PRN of the top branching node to generate at least a PRN of a leaf node of the second PRN tree that corresponds to the portion.

In Example 52, which includes the subject matter of any of Examples 45-51, the communications component may transmit to the computing device a second PRN of a branching node of the second PRN tree that corresponds to the branching node of the first PRN tree that corresponds to the first PRN to grant the computing device a second type of access to the portion by enabling the computing device to use the second PRN as a seed to generate at least a PRN of the leaf node of the second PRN tree that corresponds to the portion for use by the computing device to request the second type of access to the portion in addition to the first type of access.

In Example 53, which includes the subject matter of any of Examples 45-52, the apparatus may include a random number generator (RNG) coupled to the processor component and may include circuitry to generate a seed value based on at least one of a quantum effect or a noise source, the PRN component may trigger the RNG to generate the seed value, and the PRN component may generate a PRN for a top branching node at a top of the first PRN tree from the seed value.

In Example 54, which includes the subject matter of any of Examples 45-53, the RNG may include circuitry to generate PRNs, and the PRN component may trigger the RNG to generate PRNs for each node of the first multitude of nodes.

In Example 55, a computing-implemented method includes determining, at a server, whether a request received from a computing device for access to a portion of data stored by the server identifies the portion with an address at which the portion is stored or with a combination of a first pseudo-random number (PRN) of a first leaf node of a first PRN tree and an indication of a location of a second leaf node within a branching structure of a second PRN tree, the request received via a network coupled to the server, and the first and second leaf nodes corresponding to the portion; based on the determination, pseudo-randomly generating a second PRN of the second leaf node from a PRN of a top branching node of the second PRN tree and taking a hash of a combination of the first PRN and the second PRN to derive the address; and accessing the portion at the address to satisfy the request for access.

In Example 56, which includes the subject matter of Example 55, the method may include allowing write access to the portion at the address based on the determination.

In Example 57, which includes the subject matter of any of Examples 55-56, the first PRN tree may be associated with read access, the second PRN tree may be associated with write access, and the method may include allowing write access to the portion in response to the request identifying the portion with the address and disallowing write access to the portion in response to the request failing to identify the portion with the address.

In Example 58, which includes the subject matter of any of Examples 55-57, the method may include pseudo-randomly generating a chain of PRNs that follows a path through the branching structure of the second PRN tree to pseudo-randomly derive the second PRN, each PRN of the chain corresponding to a node of the second PRN tree, and the second PRN pseudo-randomly generated using the PRN of a branching node of the second PRN tree in the path from which the second leaf node depends as a seed.

In Example 59, which includes the subject matter of any of Examples 55-58, the method may include receiving the portion, the address and the PRN of the top branching node of the second PRN tree from another computing device via the network; storing the portion within a storage location provided by a storage device coupled to the server; and assigning the address to the storage location.

In Example 60, which includes the subject matter of any of Examples 55-59, the method may include operating an interface of the server to monitor the network for requests for access to portions of data and receiving the request for access to the portion from the computing device via the network.

In Example 61, at least one tangible machine-readable storage medium includes instructions that when executed by a processor component, may cause the processor component to determine, at a server, whether a request received from a computing device for access to a portion of data stored by the server identifies the portion with an address at which the portion is stored or with a combination of a first pseudo-random number (PRN) of a first leaf node of a first PRN tree and an indication of a location of a second leaf node within a branching structure of a second PRN tree, the request received via a network coupled to the server, and the first and second leaf nodes corresponding to the portion; based on the determination, pseudo-randomly generate a second PRN of the second leaf node from a PRN of a top branching node of the second PRN tree and take a hash of a combination of the first PRN and the second PRN to derive the address; and accessing the portion at the address to satisfy the request for access.

In Example 62, which includes the subject matter of Example 61, the processor component may be caused to allow write access to the portion at the address based on the determination.

In Example 63, which includes the subject matter of any of Examples 61-62, the first PRN tree may be associated with read access, the second PRN tree may be associated with write access, and the method may include allowing write access to the portion in response to the request identifying the portion with the address and disallowing write access to the portion in response to the request failing to identify the portion with the address.

In Example 64, which includes the subject matter of any of Examples 61-63, the processor component may be caused to pseudo-randomly generate a chain of PRNs that follows a path through the branching structure of the second PRN tree to pseudo-randomly derive the second PRN, each PRN of the chain corresponding to a node of the second PRN tree, and the second PRN pseudo-randomly generated using the PRN of a branching node of the second PRN tree in the path from which the second leaf node depends as a seed.

In Example 65, which includes the subject matter of any of Examples 61-64, the processor component may be caused to receive the portion, the address and the PRN of the top branching node of the second PRN tree from another computing device via the network; store the portion within a storage location provided by a storage device coupled to the server; and assign the address to the storage location.

In Example 66, which includes the subject matter of any of Examples 61-65, the processor component may be caused to operate an interface of the server to monitor the network for requests for access to portions of data and receive the request for access to the portion from the computing device via the network.

In Example 67, at least one tangible machine-readable storage medium may include instructions that when executed by a processor component, cause the processor component to perform any of the above.

In Example 68, an apparatus may include means for performing any of the above.

The invention claimed is:

1. An apparatus comprising:
   processing circuitry; and
   a memory, comprising instructions executable by the processing circuitry, the instructions to cause the processing circuitry to:
      divide an item of data into multiple portions based on an organizational structure of the item of data;
      generate a first pseudo-random number (PRN) tree to comprise a first multitude of nodes and a branching structure based on the organizational structure of the item of data, the first multitude of nodes to comprise at least one branching node at which branching occurs and multiple leaf nodes of which each leaf node corresponds to a portion of the multiple portions, the at least one branching node to include a top branching node at a top of the first PRN tree, the multiple leaf nodes to depend from the at least one branching node and extend towards a bottom of the first PRN tree;
      generate a PRN for each node of the first multitude of nodes, wherein a PRN of the top branching node is used as a seed value to generate a PRN for a branching node that depends from the top branching node; and
      transmit the multiple portions and multiple addresses based on PRNs of leaf nodes of the first PRN tree to a server via a network to enable the server to store each portion at an address of the multiple addresses.

2. The apparatus of claim 1, the memory comprising instructions to cause the processing circuitry to:
   use a PRN of a leaf node as a seed to generate an encryption PRN for the leaf node, and
   use the encryption PRN as an encryption key to encrypt the portion of the multiple portions that corresponds to the leaf node prior to transmitting the portion to the server.

3. The apparatus of claim 2, the memory comprising instructions to cause the processing circuitry to:
   use the PRN of the leaf node as a seed to generate a verification PRN for the leaf node, and
   take a first cryptographic hash of the portion using the verification PRN as an input to a cryptographic hash function following encryption of the portion.

4. The apparatus of claim 3, the memory comprising instructions to cause the processing circuitry to:
   transmit a request to the server for access to the portion that corresponds to the leaf node,
   take a second cryptographic hash of the portion as received from the server,
   compare the first and second cryptographic hashes to verify an integrity of the portion as received from the server, and
   use the encryption PRN to decrypt the portion following verification of the integrity of the portion.

5. The apparatus of claim 1, the memory comprising instructions to cause the processing circuitry to transmit a first PRN of a branching node of the first PRN tree and an indication of the branching structure to a computing device to grant the computing device a first type of access to a portion of the multiple portions as stored by the server by enabling the computing device to use the first PRN as a seed to generate at least a PRN of the leaf node of the first PRN tree that corresponds to the portion for use by the computing device as an address in a request transmitted to the server for the first type of access to the portion, the branching structure of the first PRN tree and the selection of the branching node of the first PRN to cooperate to define a scope of the first type of access granted to the computing device.

6. The apparatus of claim 1, comprising a random number generator (RNG) coupled to the processing circuitry and comprising circuitry to generate a seed value based on at least one of a quantum effect or a noise source, and the memory comprising instructions to cause the processing circuitry to trigger the RNG to generate the seed value, and generate the PRN for the top branching node at the top of the first PRN tree from the seed value.

7. A computer-implemented method comprising:
   dividing an item of data into multiple portions based on an organizational structure of the item of data;
   generating a first pseudo-random number (PRN) tree comprising a first multitude of nodes and a branching structure based on the organizational structure of the item of data, the first multitude of nodes comprising at least one branching node at which branching occurs and multiple leaf nodes of which each leaf node corresponds to a portion of the multiple portions, the at least one branching node including a top branching node at a top of the first PRN tree, the multiple leaf nodes depending from the at least one branching node and extending towards a bottom of the first PRN tree;
   generating a PRN for each node of the first multitude of nodes, the PRN of the top branching node of the first PRN tree used as a seed to generate a PRN for a branching node that depends from the top branching node; and
   transmitting the multiple portions and multiple addresses based on PRNs of leaf nodes of the first PRN tree to a server to enable the server to store each portion at an address of the multiple addresses.

8. The computer-implemented method of claim 7, the method comprising:
   generating an encryption PRN for the leaf node using a PRN of a leaf node as a seed value; and
   encrypting the portion of the multiple portions that corresponds to the leaf node using the encryption PRN as an encryption key prior to transmitting the portion to the server.

9. The computer-implemented method of claim 8, the method comprising:
   generating a verification PRN for the leaf node using the PRN of the leaf node as a seed value;

taking a first cryptographic hash of the portion using the verification PRN as an input to a cryptographic hash function following encryption of the portion;

transmitting a request to the server for access to the portion that corresponds to the leaf node;

taking a second cryptographic hash of the portion as received from the server;

comparing the first and second cryptographic hashes to verify the integrity of the portion as received from the server; and decrypting the portion using the encryption PRN following verification of the integrity of the portion.

10. The computer-implemented method of claim 7, the method comprising transmitting a first PRN of a branching node of the first PRN tree and an indication of the branching structure to a computing device to grant the computing device a first type of access to a portion of the multiple portions as stored by the server by enabling the computing device to use the first PRN as a seed to generate at least a PRN of the leaf node of the first PRN tree that corresponds to the portion for use by the computing device as an address in a request transmitted to the server for the first type of access to the portion, the branching structure of the first PRN tree and the selection of the branching node of the first PRN cooperating to define a scope of the first type of access granted to the computing device.

11. The computer-implemented method of claim 10, the method comprising:
generating a second PRN tree comprising a second multitude of nodes and the branching structure of the first PRN tree, the second multitude of nodes comprising at least one branching node at which branching occurs and multiple leaf nodes of which each leaf node corresponds to a portion of the multiple portions, the at least one branching node comprising a top branching node at a top of the second PRN tree and the leaf nodes depending from the at least one branching node and extending towards a bottom of the second PRN tree;
generating a PRN for each node of the second multitude of nodes, the PRN of a branching node of the second PRN tree used as a seed to generate a PRN for a leaf node that depends from the branching node; and
transmitting a PRN of the top branching node to the server to enable the server to use the PRN of the top branching node to generate at least a PRN of a leaf node of the second PRN tree that corresponds to the portion.

12. The computer-implemented method of claim 11, the method comprising transmitting to the computing device a second PRN of a branching node of the second PRN tree that corresponds to the branching node of the first PRN tree that corresponds to the first PRN to grant the computing device a second type of access to the portion by enabling the computing device to use the second PRN as a seed to generate at least a PRN of the leaf node of the second PRN tree that corresponds to the portion for use by the computing device to request the second type of access to the portion in addition to the first type of access.

13. At least one tangible machine-readable storage medium comprising instructions that when executed by a processor component, cause the processor component to:
divide an item of data into multiple portions based on an organizational structure of the item of data;
generate a first pseudo-random number (PRN) tree to comprise a first multitude of nodes and a branching structure based on the organizational structure of the item of data, the first multitude of nodes to comprise at least one branching node at which branching occurs and multiple leaf nodes of which each leaf node corresponds to a portion of the multiple portions, the at least one branching node to include a top branching node at a top of the first PRN tree, the multiple leaf nodes to depend from the at least one branching node and extend towards a bottom of the first PRN tree;
generate a PRN for each node of the first multitude of nodes, the PRN of the top branching node of the first PRN tree used as a seed to generate a PRN for a branching node that depends from the top branching node; and
transmit the multiple portions and multiple addresses based on PRNs of leaf nodes of the first PRN tree to a server to enable the server to store each portion at an address of the multiple addresses.

14. The at least one tangible non-transitory machine-readable storage medium of claim 13, the processor component caused to:
generate an encryption PRN for the leaf node using a PRN of a leaf node as a seed value; and
encrypt the portion of the multiple portions that corresponds to the leaf node using the encryption PRN as an encryption key prior to transmitting the portion to the server.

15. The at least one tangible non-transitory machine-readable storage medium of claim 13, the processor component caused to transmit a first PRN of a branching node of the first PRN tree and an indication of the branching structure to a computing device to grant the computing device a first type of access to a portion of the multiple portions as stored by the server by enabling the computing device to use the first PRN as a seed to generate at least a PRN of the leaf node of the first PRN tree that corresponds to the portion for use by the computing device as an address in a request transmitted to the server for the first type of access to the portion, the branching structure of the first PRN tree and the selection of the branching node of the first PRN to cooperate to define a scope of the first type of access granted to the computing device.

16. The at least one tangible non-transitory machine-readable storage medium of claim 15, the processor component caused to:
generate a second PRN tree comprising a second multitude of nodes and the branching structure of the first PRN tree, the second multitude of nodes comprising at least one branching node at which branching occurs and multiple leaf nodes of which each leaf node corresponds to a portion of the multiple portions, the at least one branching node comprising a top branching node at a top of the second PRN tree and the leaf nodes depending from the at least one branching node and extending towards a bottom of the second PRN tree;
generate a PRN for each node of the second multitude of nodes, the PRN of a branching node of the second PRN tree used as a seed to generate a PRN for a leaf node that depends from the branching node; and
transmit a PRN of the top branching node to the server to enable the server to use the PRN of the top branching node to generate at least a PRN of a leaf node of the second PRN tree that corresponds to the portion.

17. The at least one tangible non-transitory machine-readable storage medium of claim 16, the processor component caused to transmit to the computing device a second PRN of a branching node of the second PRN tree that corresponds to the branching node of the first PRN tree that corresponds to the first PRN to grant the computing device a second type of access to the portion by enabling the computing device to use the second PRN as a seed to generate at least a PRN of the leaf node of the second PRN tree that corresponds to the portion for use by the computing device to request the second type of access to the portion in addition to the first type of access.

18. The at least one tangible non-transitory machine-readable storage medium of claim 17, the first type of access comprising read access and the second type of access comprising access to modify data.

19. The at least one tangible non-transitory machine-readable storage medium of claim 13, the item of data comprising at least one of text, a table, a still image, a chart, a graph, motion video, audio, an equation, biometric data, a genetic sequence, financial data, statistical data, behavioral data, location data or spending data.

* * * * *